(12) United States Patent
Mullikin

(10) Patent No.: US 9,964,389 B2
(45) Date of Patent: May 8, 2018

(54) MEASURING DEVICE

(71) Applicant: Peddinghaus Corporation, Bradley, IL (US)

(72) Inventor: Jeffrey A. Mullikin, Andrews, SC (US)

(73) Assignee: Peddinghaus Corporation, Bradley, IL (US)

( * ) Notice: Subject to any disclaimer, the term of this patent is extended or adjusted under 35 U.S.C. 154(b) by 113 days.

(21) Appl. No.: 15/232,964

(22) Filed: Aug. 10, 2016

(65) Prior Publication Data

US 2018/0003472 A1 Jan. 4, 2018

Related U.S. Application Data

(60) Provisional application No. 62/356,156, filed on Jun. 29, 2016.

(51) Int. Cl.
 *G01B 3/12* (2006.01)
(52) U.S. Cl.
 CPC ...................... *G01B 3/12* (2013.01)
(58) Field of Classification Search
 CPC ....................................................... G01B 3/12
 USPC ................. 33/533, 546, 550, 551, 552, 778
 See application file for complete search history.

(56) References Cited

U.S. PATENT DOCUMENTS

| | | | |
|---|---|---|---|
| 3,844,044 A | 10/1974 | Culver | |
| 3,942,253 A * | 3/1976 | Gebel | G01B 5/201 33/551 |
| 4,171,575 A | 10/1979 | Blessing et al. | |
| 6,782,631 B1 * | 8/2004 | Face, III | G01C 7/04 33/501.02 |
| 7,472,490 B2 * | 1/2009 | Kube | B24B 5/37 33/551 |
| 2011/0100181 A1 * | 5/2011 | Mullikin | B21D 28/243 83/439 |
| 2012/0047757 A1 * | 3/2012 | Alkhalifah | G01B 3/12 33/701 |
| 2016/0161239 A1 * | 6/2016 | Takanashi | G01B 5/201 33/551 |

(Continued)

FOREIGN PATENT DOCUMENTS

| | | |
|---|---|---|
| GB | 1486595 A | 9/1977 |
| JP | S52 138760 U | 10/1977 |

OTHER PUBLICATIONS

Prior art brochure of Peddinghaus Corporation, dated Feb. 17, 2015, showing measurement wheels on pp. 4, 6.

*Primary Examiner* — G. Bradley Bennett
(74) *Attorney, Agent, or Firm* — Wood, Phillips, Katz, Clark & Mortimer

(57) ABSTRACT

A device for measuring a workpiece surface along an X-axis, the measured surface residing generally within an X-Y plane. The measuring device has a ring body supported on a pivot body for pivoting in a limited angular range about a pivot axis spaced from and substantially parallel to the X-axis. The measuring device also has a base fixed in the direction of the Y-axis and a ring body supported on the base for limited movement relative to the base in a direction substantially parallel to the Y-axis. A measurement wheel is rotatable about an axis of rotation defined by the ring body and rolls along the workpiece surface when the workpiece and the measurement device move relative to one another in the direction of the X-axis.

20 Claims, 25 Drawing Sheets

(56) References Cited

U.S. PATENT DOCUMENTS

2016/0377406 A1* 12/2016 Fan .................. G01B 5/201
33/550
2017/0129039 A1* 5/2017 Williams ............ B23K 10/006

* cited by examiner

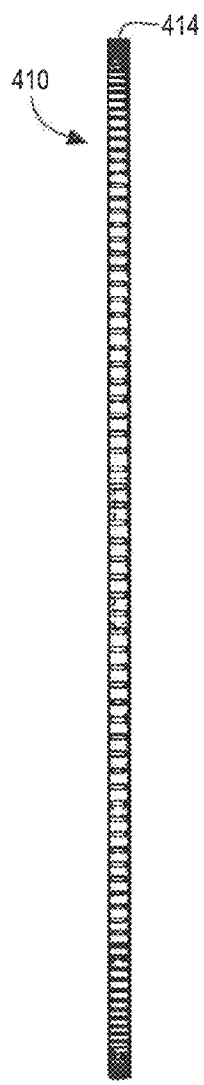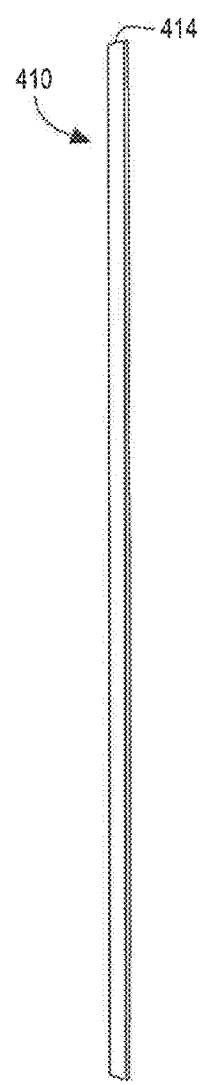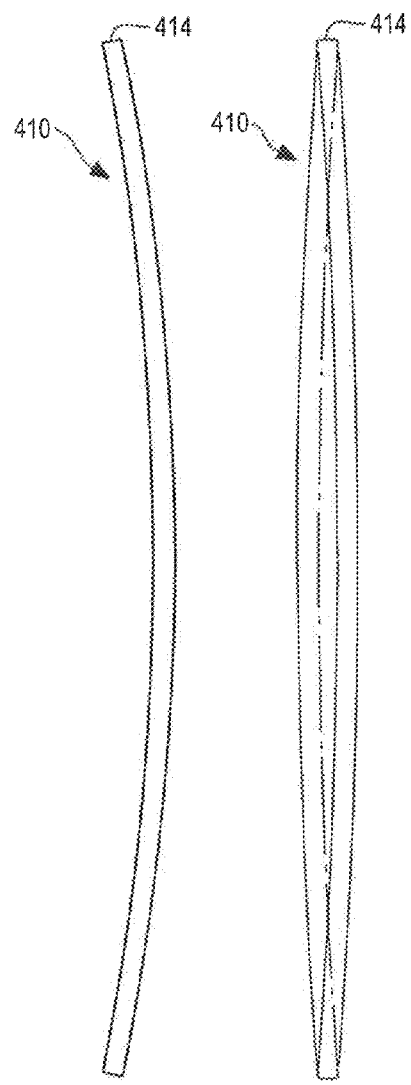
FIG. 5 PRIOR ART  FIG. 6A PRIOR ART  FIG. 6B PRIOR ART  FIG. 6C PRIOR ART

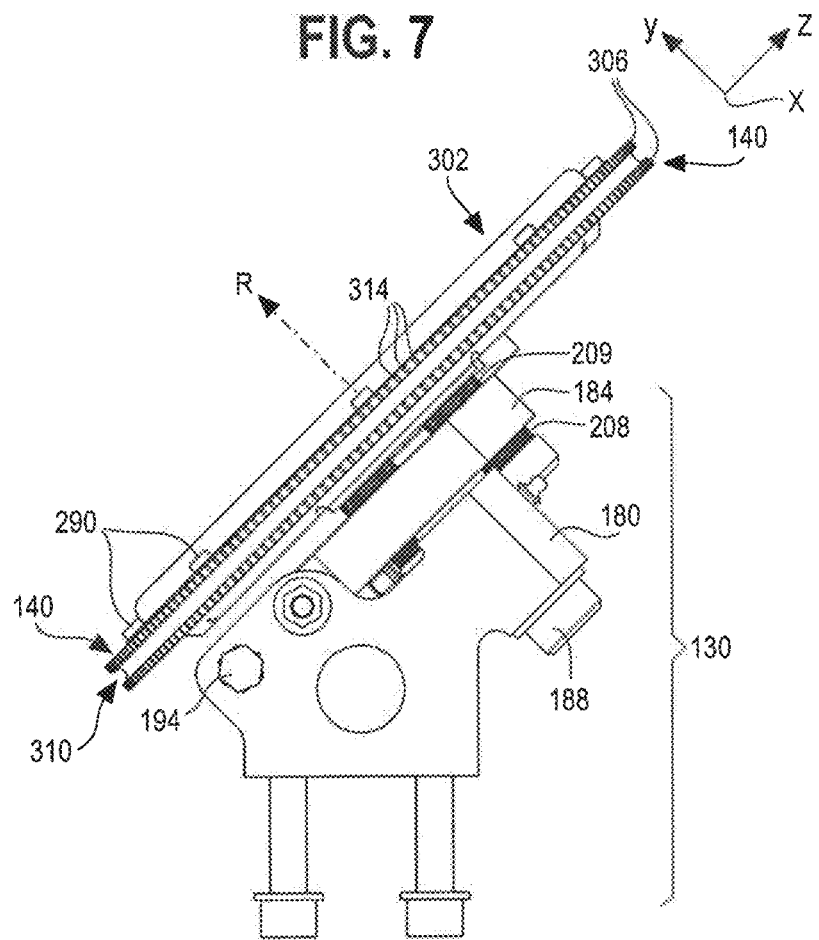

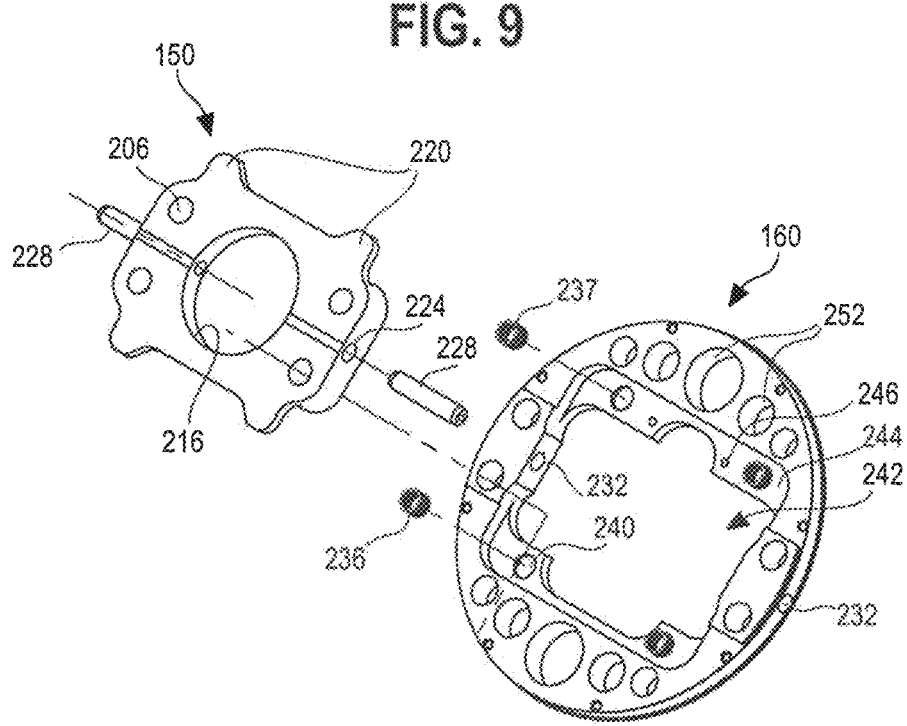

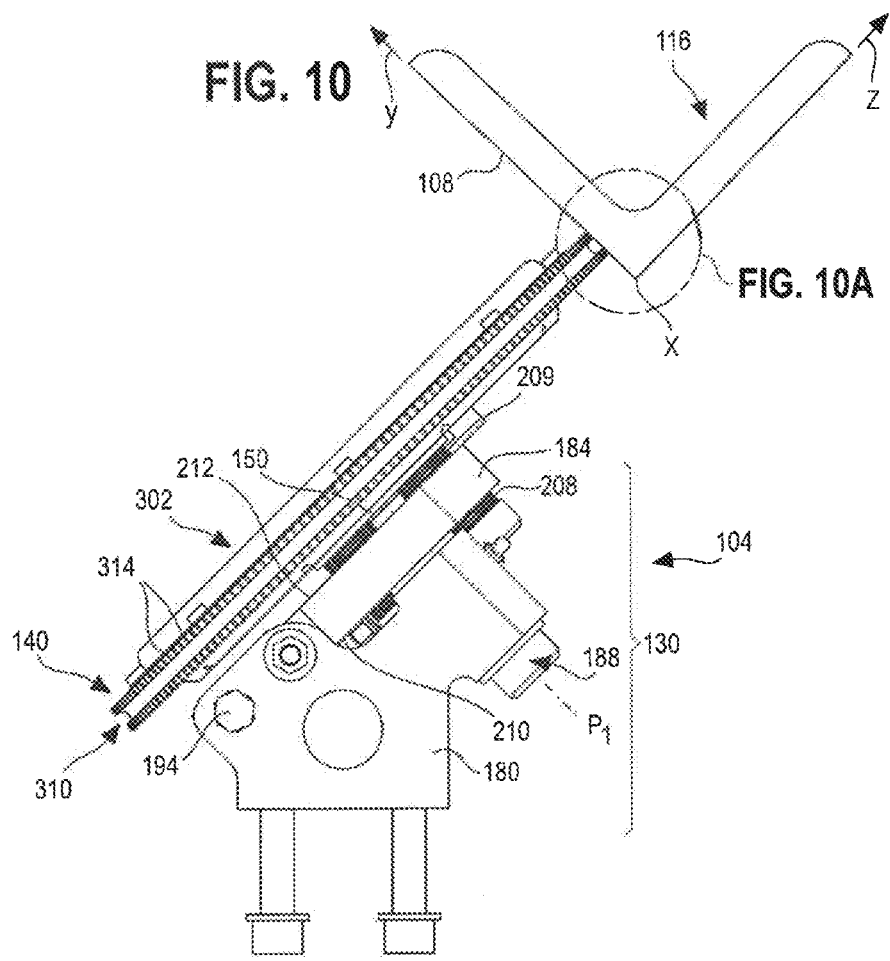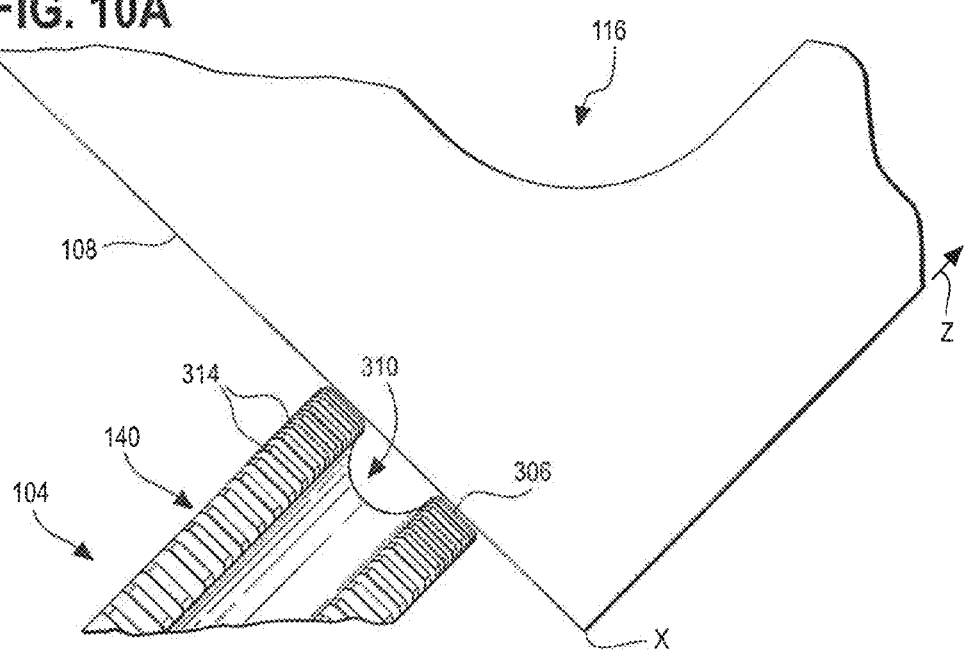

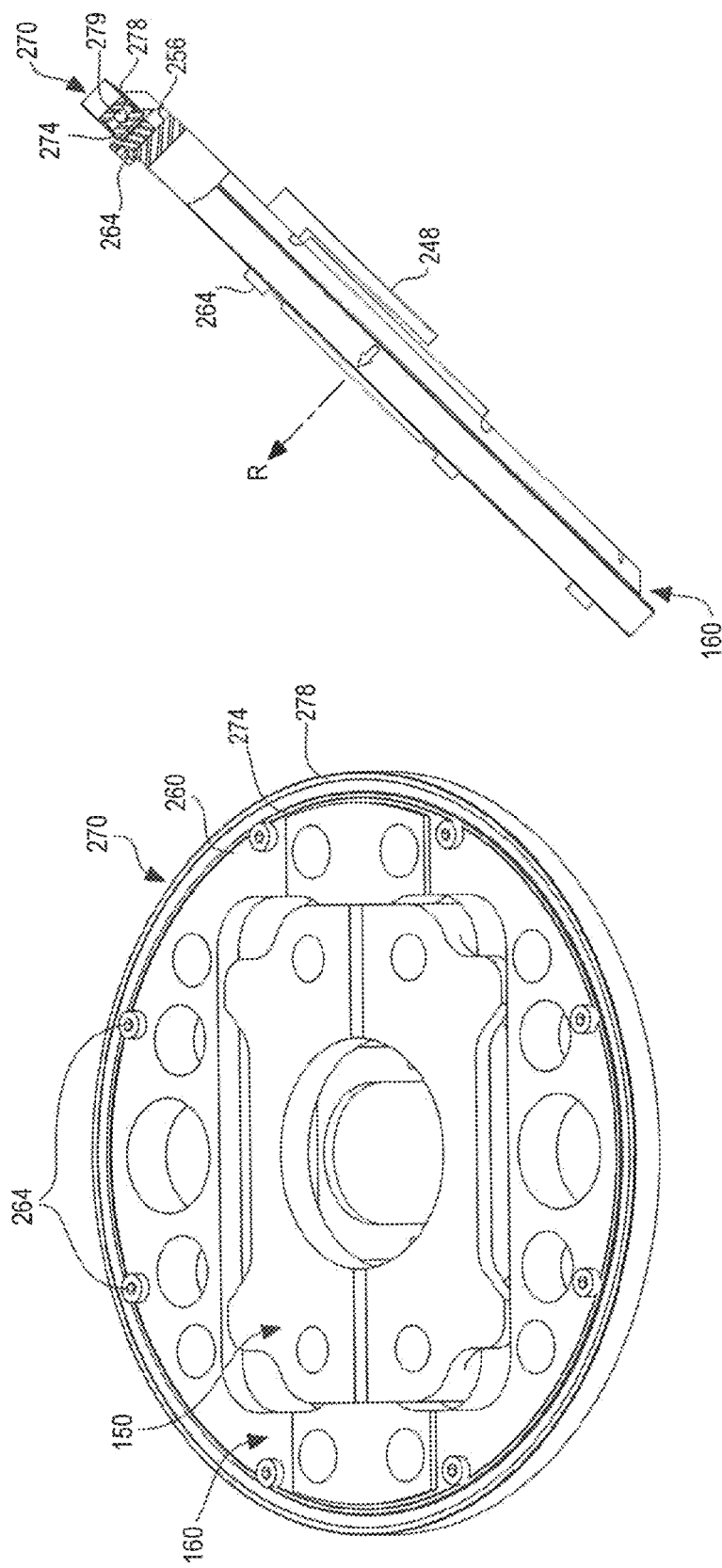

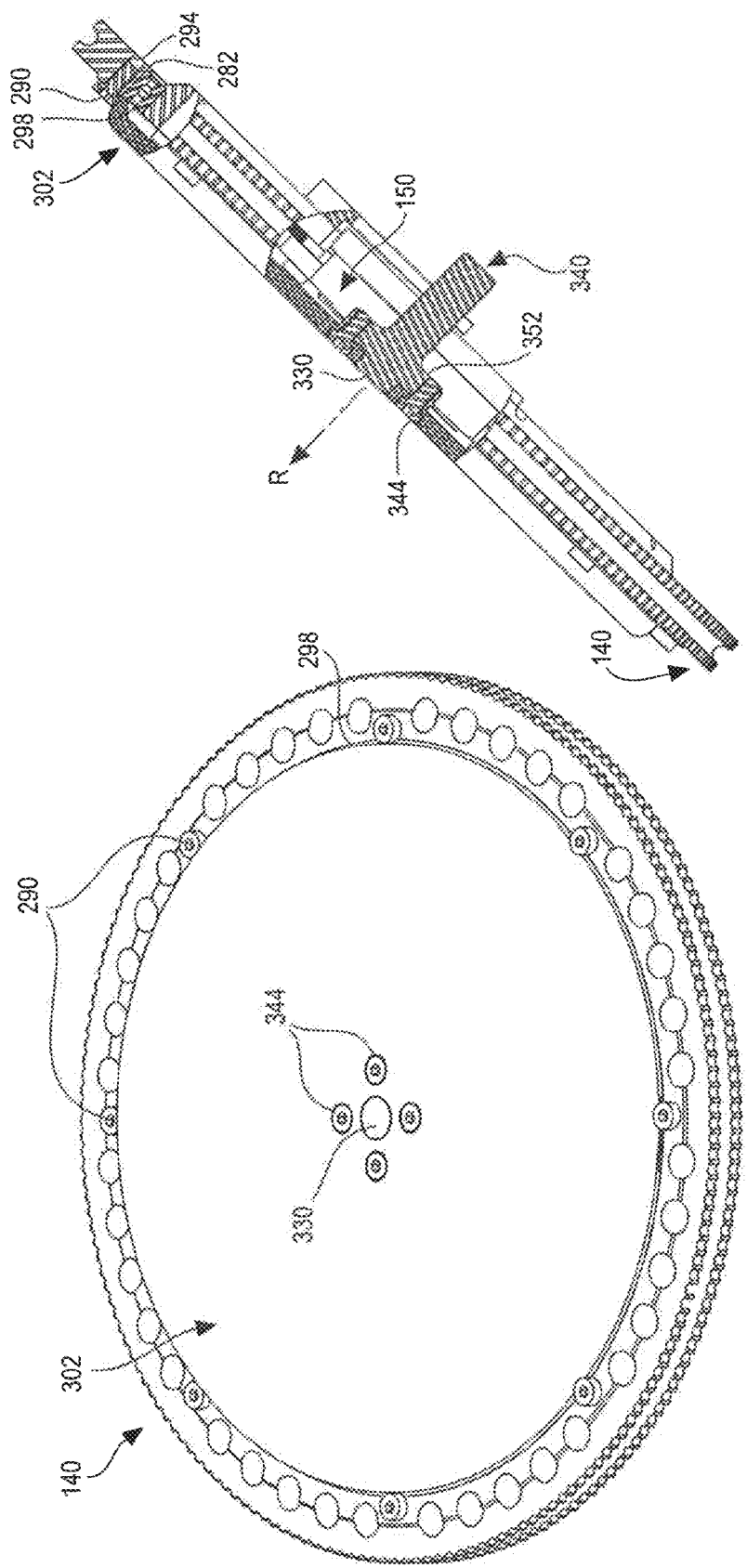

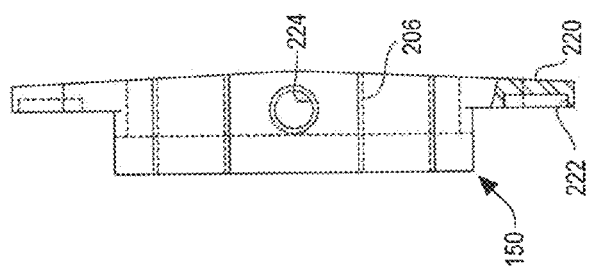
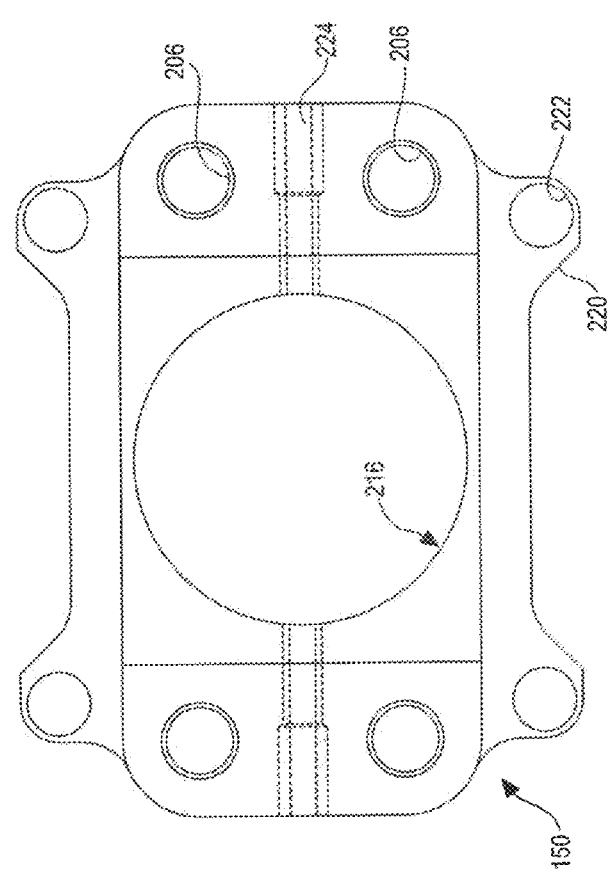
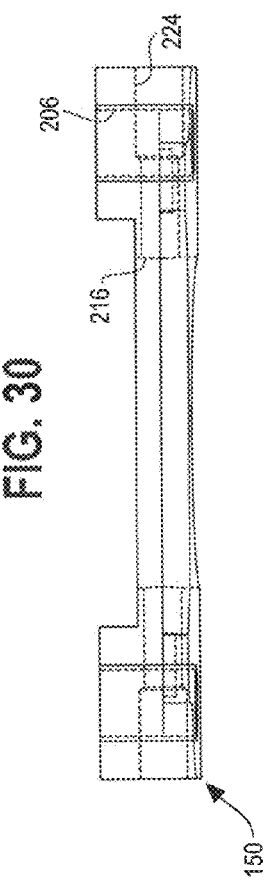

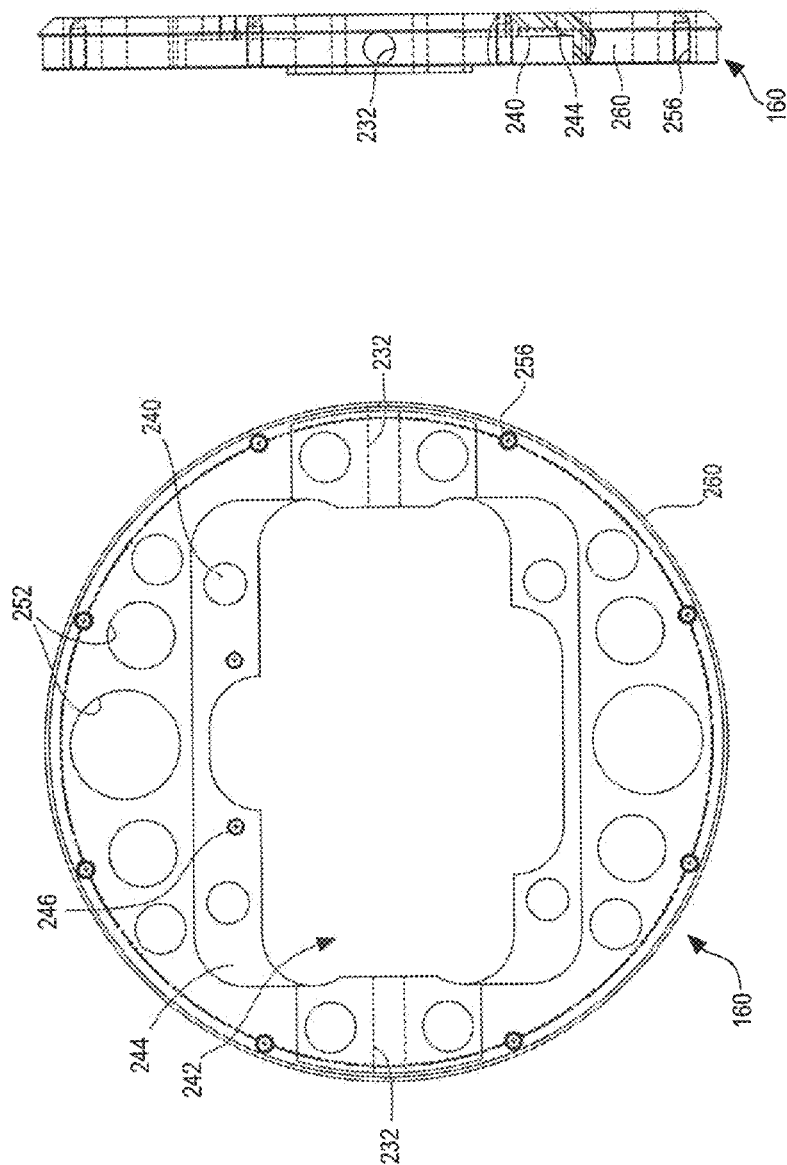

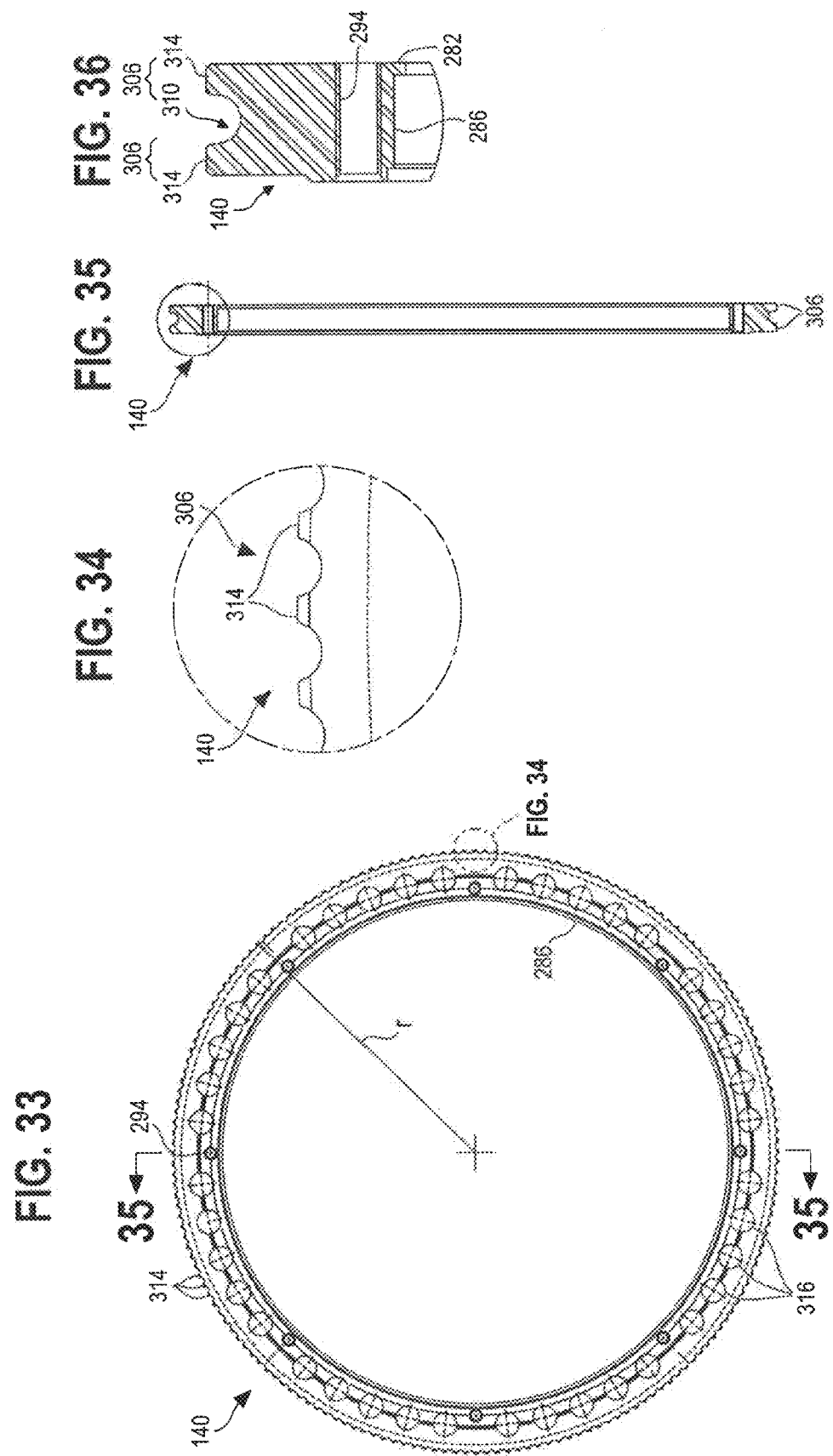

MEASURING DEVICE

CROSS-REFERENCE TO RELATED APPLICATIONS

This is a non-provisional application claiming priority to U.S. Provisional Application Ser. No. 62/356,156, entitled "Measuring Device" and filed on Jun. 29, 2016.

FIELD OF THE INVENTION

The present invention relates to a measuring device for measuring a surface of a workpiece (including, for example, a piece of structural metal) such as before, during, or after processing of the workpiece.

BACKGROUND OF THE INVENTION

Fabrication of a structural member or workpiece (such as, for example, a structural steel I-beam, wide flange H-beam, angle, channel, flat plate, etc.) may require processing such as cutting, drilling, punching, scribing or marking, and/or shearing portions of the workpiece. Conventional and specialized processing machines perform these processing operations. For example, a processing machine can be used to drill holes in a workpiece.

In one type of processing line or layout, one or more workpieces are supported lengthwise on a series of storage tables or transfer stands that are located adjacent to a main conveyor, where the workpieces are loaded or conveyed onto the main conveyor, which leads to, and away from, one or more processing machines. The main conveyor has, for example, been an elevated structure having chain-driven rollers that define a conveying path and are capable of supporting and conveying the workpiece along a desired path. In order to accurately determine the location of the workpiece as it is conveyed relative to a processing machine, devices have been used to measure the length of the workpiece that has been indexed (i.e., moved) into or through the machine along an X-axis. For example, measuring devices have used a wheel biased in the Z direction against a measured workpiece surface maintained in an X-Y plane (normal to the Z direction, with the wheel rolling on the measured workpiece surface. A rotational sensor or shaft encoder has measured the rotational movement of the wheel which data is converted by a processor or control system of the processing machine into the distance travelled by the workpiece along the X-axis.

For example, FIGS. 1 and 2 illustrate a prior art processing machine 100 for punching, shearing, and marking, sold under the name AngleMaster, designated as model no. AFPS-643/Q by Peddinghaus Corporation, having offices at 300 N Washington Ave, Bradley, Ill. 60915. This processing machine is especially suitable for use with large mass or heavy workpieces and includes a prior art measuring device 400 especially suitable for use with large mass or heavy workpieces (e.g., large structural supports such as wide-flange H-beams, I-beams, C-beams, or angles, channels for use in building construction). The weight per unit length of a very heavy wide flange H-beam processed in the United States of America may, for example, exceed about 1,100 kg/m.

The processing machine 100 includes, inter alia, a measuring device 400 having a wheel 410 which rolls along a surface 108 of a workpiece 116 moved in the X axis direction (FIGS. 3 and 4). For clarity of description and orientation, the surface 108 lies in the X-Y plane of an orthogonal space having X-Y-Z axes, with measurement being of workpiece movement in the X direction. Thus, it should be appreciated that the wheel 410 of the device 400 rotates around a rotational axis "RPA" which is spaced from the surface 108 in the Z direction and is substantially parallel to the Y axis. It should also be appreciated that in addition to the illustrated machine 100, such measuring devices 400 have and can also be used with other processing machines for punching, drilling, cutting, welding, marking, etc. one or more workpieces, or other machines for handling materials having a surface to be measured.

A workpiece 116 in the form of an angle is shown in FIGS. 1-2 resting on several rollers 118 at the inlet side 120 of the processing machine 100, prior to processing of the workpiece 116. The measuring device 400 is shown affixed to the inlet side 120 of the processing machine 100, and additional measuring devices (not shown in the drawings) have also been included (e.g., affixed toward an outlet side 122 of the processing machine 100) with the illustrated and other processing machines. When the workpiece 116 is moved or conveyed from the initial position shown in FIG. 2 into the processing machine 100, the workpiece 116 will be hydraulically clamped by the processing machine 100 against one or more datum rollers or surfaces so as to locate the workpiece 116 in a known position relative to the processing machine 100. Additionally, one or more suitable edge detecting sensors of the machine may be used to locate the forward or leading edge of the workpiece 116, whereupon with the workpiece 116 clamped in this known position against the datum, the measurement device wheel 410 that rolls along the surface 108 of the workpiece 116, where rotation of the wheel 410 is monitored to determine movement and positioning of the workpiece 116 in the X-direction.

The prior art measuring device wheel 410 has a plurality of circumferentially spaced radial teeth 414 which make contact with the X-Y surface 108 of the workpiece 116. When the dimensions of the wheel 410 are known and the wheel 410 rolls without slipping on the workpiece surface 108, proper measurements may be taken. However, undesirable relative movement (e.g., rotation or translation which could be caused by material imperfections of the workpiece 116 or forces imparted on the workpiece 116 during processing) are sometimes encountered between the workpiece 116 and the wheel 410. Such undesirable relative movement and forces can damage the wheel 410. For example, uneven or angled rolling of the teeth 414 relative to the workpiece surface 108 can result in forces in the Y direction, leading to undesirable wear and/or warping which can essentially change the dimensions of the wheel 410. For example, the measuring wheel 410 having the configuration as shown in FIG. 5 can have its teeth 414 worn down unevenly (FIG. 6A) and/or can be worn warped in a single direction (FIG. 6B) or in multiple directions like a potato chip (FIG. 6C). Such distortions of the measuring wheel 410 can result in inaccurate recording of the movement of the workpiece 116, whether from distortions in the wheel 410 itself or from failure to make proper rolling contact between the workpiece 116 and the wheel 410.

The present invention is directed toward overcoming one or more of the problems discussed above.

SUMMARY OF THE INVENTION

The present invention relates to an improved device for measuring a surface of a workpiece. In a space having orthogonal X-Y-Z axes, the device measures movement of a surface of a workpiece in the direction of the X-axis, the surface residing generally within an X-Y plane.

In one aspect of the present invention, the measuring device has a ring body supported for pivoting relative to a pivot body within a limited angular range about a pivot axis that is spaced from, and substantially parallel to, the X-axis. A measurement wheel is rotatable about an axis of rotation defined by the ring body, with the axis of rotation being within the limited angular range of parallel to the Y-axis. The axis of rotation is spaced from the workpiece surface in the direction of the Z-axis by substantially the radius of the measurement wheel, whereby the measurement wheel rolls along the workpiece surface when the workpiece and the pivot body move relative to one another in the direction of the X-axis.

In one form of this aspect of the present invention, biasing mechanisms bias the ring body in opposite pivoting directions toward a centered position in which the axis of rotation is parallel to the Y-axis.

In another aspect of the present invention, the measuring device has a pivot body supported for limited movement relative to a base in a direction substantially parallel to the Y-axis, with a measurement wheel carried by the pivot body for rotation about an axis of rotation, whereby the measurement wheel rolls along the workpiece surface when the workpiece and the base move relative to one another in the direction of the X-axis and may adjustably shift in the direction substantially parallel to the Y-axis.

In one form of this aspect of the present invention, biasing mechanisms bias the pivot body in opposite directions relative to said base wherein opposing biasing forces define a neutral position of the pivot body in the Y direction.

Other objects, features, and advantages of the invention will become apparent from a review of the entire specification, including the appended claims and drawings.

BRIEF DESCRIPTION OF THE DRAWINGS

FIG. 5 is a rotated, rear elevation view of just a measurement wheel of the prior art measuring device of FIG. 4;

FIG. 6A is an exaggerated, simplified illustration of a first failure mode of the wheel of the prior art measuring device of FIG. 4;

FIG. 6B is an exaggerated, simplified illustration of a second failure mode of the wheel of the prior art measuring device of FIG. 4;

FIG. 6C is an exaggerated, simplified illustration of a third failure mode of the wheel of the prior art measuring device of FIG. 4;

FIG. 7 is a rear elevation view of a measuring device for a processing machine according to the present invention;

FIG. 9 is an exploded view of selected components of the measuring device shown in FIG. 7;

FIG. 10 is a rear elevation view of the measuring device shown in FIG. 7 showing the measuring device in engagement with a workpiece;

FIG. 10A is an enlarged view of a portion of the measuring device and workpiece shown enclosed in the circled area in FIG. 10;

FIG. 21 is a right side elevation view of the subassembly shown in FIG. 19 assembled together with a thin wall bearing;

FIG. 22 is a broken, rear elevation view of the subassembly of FIG. 21 with a portion of the ring body and the thin wall bearing broken away;

FIG. 23 is a right side elevation view of the subassembly of FIG. 22 assembled together with a wheel, a hub, and a central shaft;

FIG. 24 is a rear elevation view of the subassembly of FIG. 23 with a portion of the hub, the shaft, the thin wall bearing, and the wheel broken away;

FIG. 28 is a bottom plan view of the pivot body of the measuring device shown in FIG. 11;

FIG. 29 is a front elevation view of the pivot body shown in FIG. 28 with a portion of the pivot body broken away around a recessed surface in the pivot body;

FIG. 30 is a right side elevation view of the pivot body shown in FIG. 28;

FIG. 31 is a top plan view of only the ring body of the measuring device shown in FIG. 11;

FIG. 32 is a rear elevation view of the ring body shown in FIG. 31 with a portion of the ring body broken away;

FIG. 33 is a top plan view of the measurement wheel of the measuring device shown in FIG. 11;

FIG. 34 is an enlarged view of a portion of the measurement wheel shown enclosed in the circled area in FIG. 33;

FIG. 35 is a cross-sectional view taken along line 35-35 of the measurement wheel shown in FIG. 33;

FIG. 36 is an enlarged view of a portion of the measurement wheel shown enclosed in the circled area in FIG. 35;

DETAILED DESCRIPTION OF THE PREFERRED EMBODIMENTS

While this invention is susceptible of embodiment in many different forms, this specification and the accompanying drawings disclose only a specific form as an example of the invention. The invention is not intended to be limited to the embodiment so described, and the scope of the invention will be pointed out in the appended claims.

Figure 1:
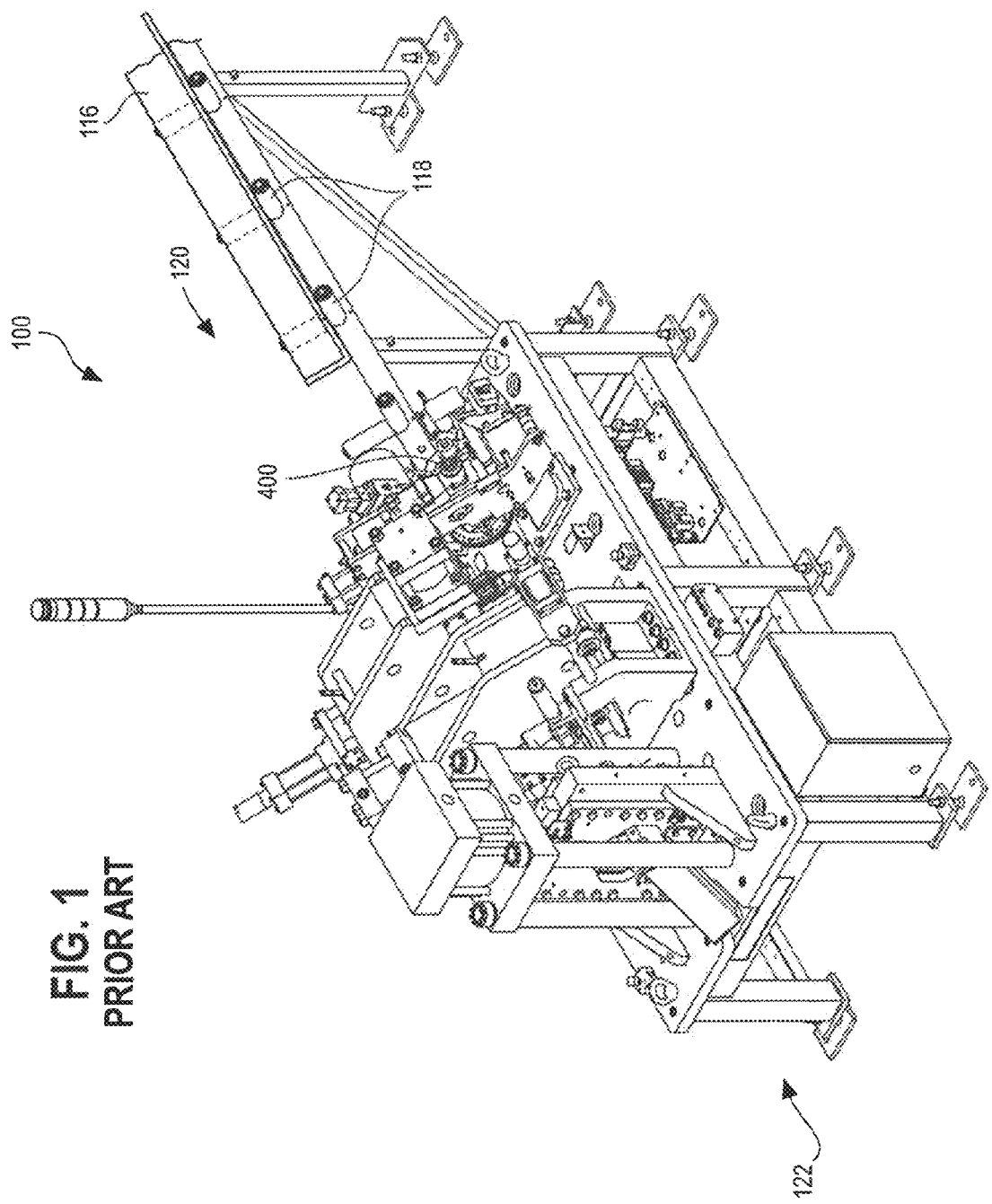
FIG. 1 is a partial, perspective view taken from above of a prior art processing machine for processing a workpiece having the form of an angle channel.
Figure 2:
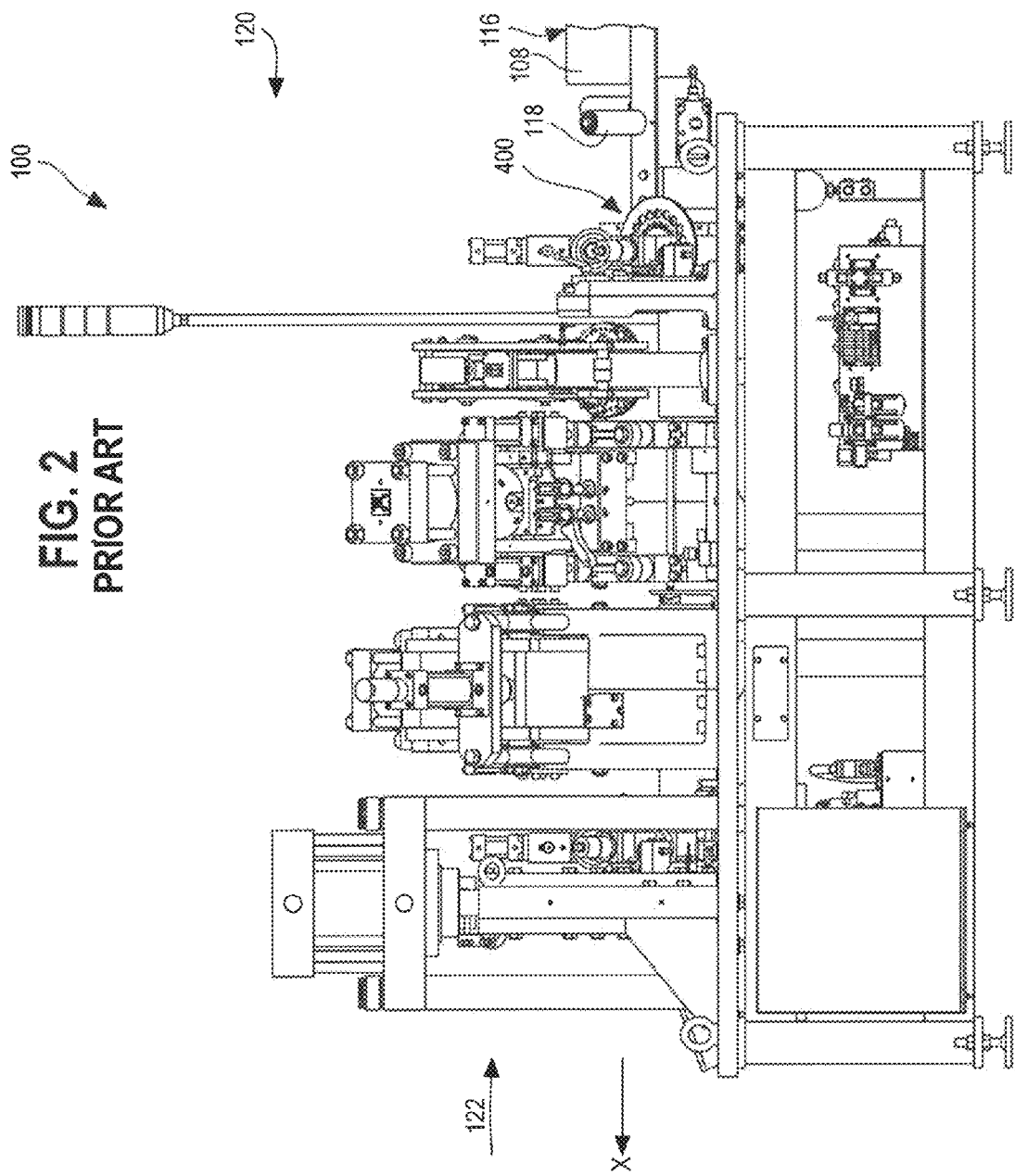
FIG. 2 is a partial, right side elevation view of the prior art processing machine of FIG. 1.

For ease of description, many figures illustrating the invention show an embodiment in the typical orientation that a measuring wheel or measuring device 104 would have when assembled with, or arranged adjacent to, a machine, such as the processing machine 100 illustrated in FIGS. 1 and 2.

Terms such as front, rear, axial, radial, normal, etc., are used with reference to the orientation of the measuring device 104 in FIG. 10, and with respect to an orthogonal space having X-Y-Z axes, wherein the measured surface (simply referred to herein as a "surface") 108 of a workpiece 116 lies in the X-Y plane with the measuring device 104 measuring movement of the workpiece 116 as it moves in the X direction through a processing machine 100 (FIGS. 1 and 2) relative to the measuring device 104 (or the measuring device 104 may be moved in the X direction relative to the workpiece 116.). As discussed in detail hereinafter, the measuring device 104 may also be selectively moved or biased in the direction of the Z-axis (normal to the X-Y plane).

The measuring device 104 of this invention is suitable for a variety of uses and need not be limited to use on processing machinery for a workpiece processing line. Furthermore, the measuring device 104 is suitable for use with conventional or special workpieces, the details of which, although not fully illustrated or described, would be apparent to those having skill in the art and an understanding of such workpieces. Apart from the measuring device 104, the particular processing machine, per se, that is illustrated and described herein forms no part of, and therefore is not intended to limit, the present invention. It will also be understood by those of ordinary skill that novel and non-obvious inventive aspects are embodied in the described exemplary measuring device 104 alone.

Still further, it should be understood that while various components of the measuring device 104 are shown assembled with various springs, washers, nuts and bolts, bearings, screws, pins, etc., such components may be unitarily formed and/or may be assembled with other common fastening or biasing means as would be obvious to one of ordinary skill in the art.

An advantageous embodiment of a measuring device 104 of the present invention, and the components thereof, is illustrated in FIGS. 7-38 such as may be connected or affixed to a portion of a processing machine 100 such as described and illustrated in FIGS. 1-2.

Figure 8:
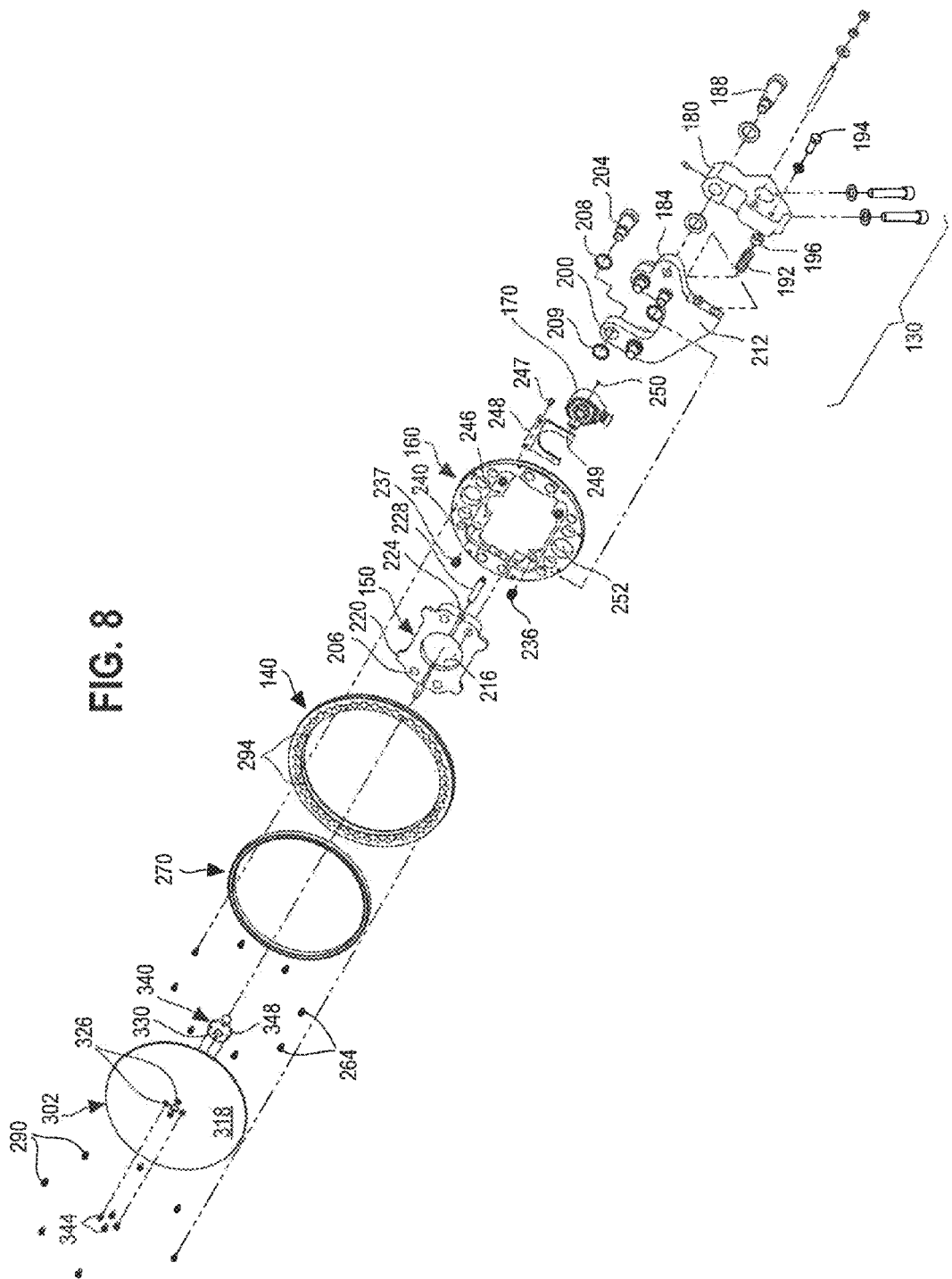
FIG. 8 is an exploded view of the measuring device shown in FIG. 7.
Figure 11:
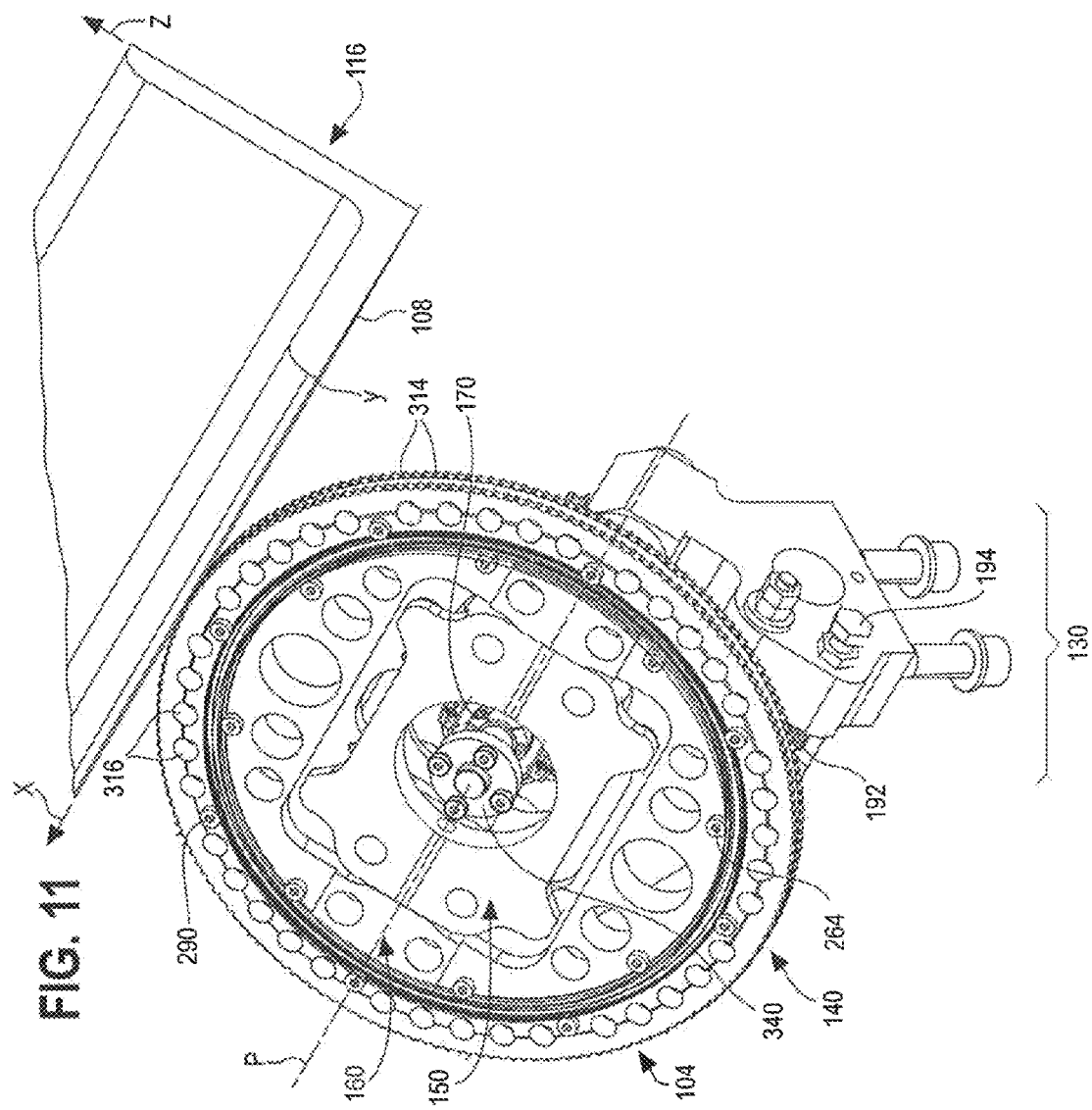
FIG. 11 is a partial, perspective view taken from above of the measuring device and the workpiece shown in FIG. 10, showing the hub component of the measuring device as transparent for illustrative purposes only.

As best shown in FIGS. 8 and 11, the measuring device 104 has the basic components of:

a. a base 130 which may be suitably fixed to a processing machine 100 (not illustrated in FIGS. 8 and 11)

b. a measurement wheel 140 having a selected radius "r" (FIG. 33) and rotatable about an axis of rotation "R" (FIG. 7), and c. a pivot plate or pivot body 150 pivotably connected (as detailed hereafter) to a center ring plate or ring body 160, with the pivot body 150 and the ring body 160 being operatively connected with, and disposed between, the base 130 and the wheel 140.

A sensor or shaft encoder 170 measures the rotational movement of the wheel 140. The rotational data from the sensor 170 may advantageously be transmitted to a suitable PLC, computer, or control system (not illustrated for ease of illustration) for converting rotational movement of the wheel 140 (through angle "A" in degrees) rolling on a workpiece surface 108 into a linear distance "D" traveled by the workpiece 116 in the X-direction, where:

$$D=(A/360)\times 2\pi r$$

Figure 27:
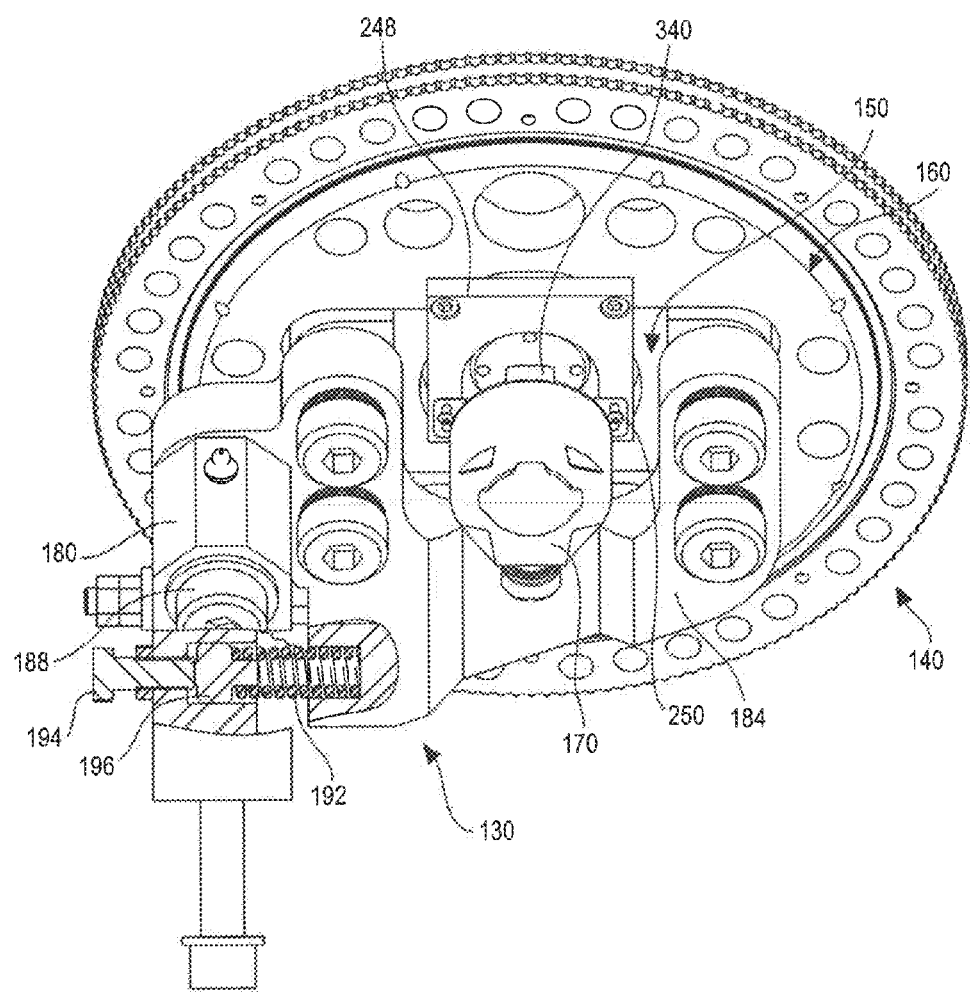
FIG. 27 is a broken, left side elevation view of the subassembly of FIG. 26 assembled together with a fixed member of a base and a rotational sensor, with a portion of the fixed member and movable member of the base broken away.
Figure 37:
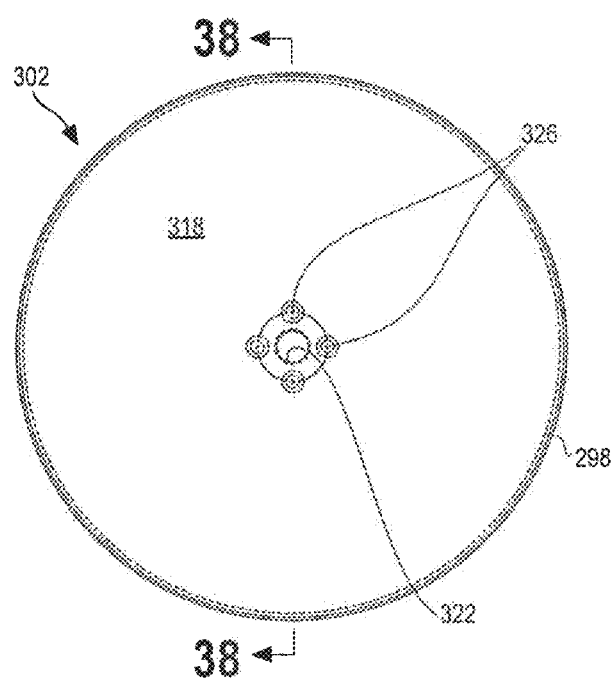
FIG. 37 is a top plan view of the hub of the measuring device shown in FIG. 7.
Figure 38:
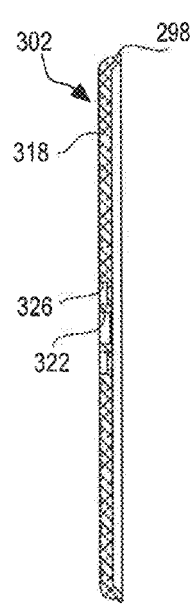
FIG. 38 is a cross-sectional view taken along the plane 38-38 of the hub shown in FIG. 37.

Referring to FIGS. 7, 10, and 27, the base 130 has a base body 180 and a swing plate or movable portion 184. The base body 180 may be suitably fixed relative to, or on, the processing machine 100 (not illustrated in FIGS. 7, 10, and 27). The swing plate 184 is supported for pivoting relative to the base body 180 in a plane that is normal to the workpiece surface 108 (FIG. 10), that is, in a plane spaced from, and parallel to, the X-Z plane.

Figure 3:
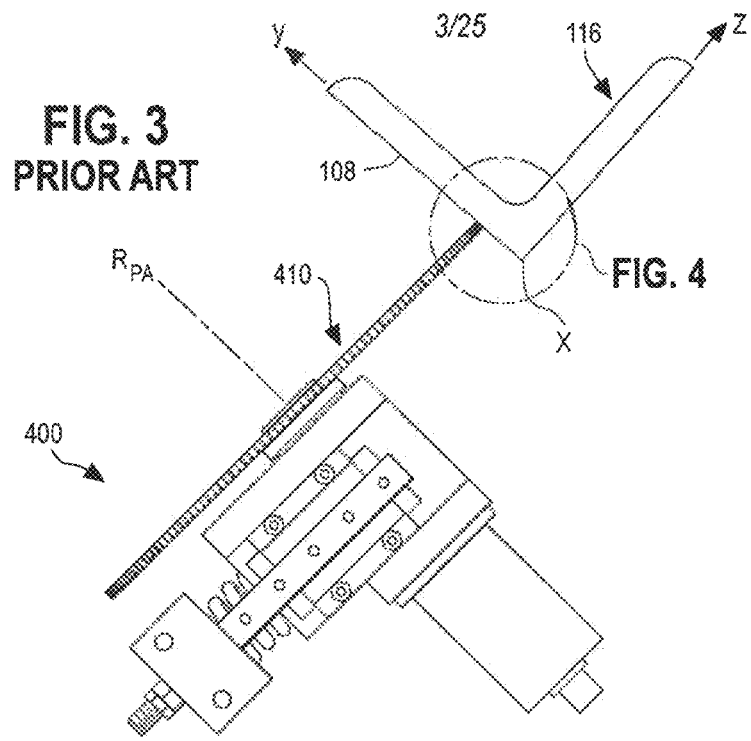
FIG. 3 is a rear elevation view of a prior art device for measuring movement of a workpiece relative a processing machine, showing engagement with a workpiece.
Figure 4:
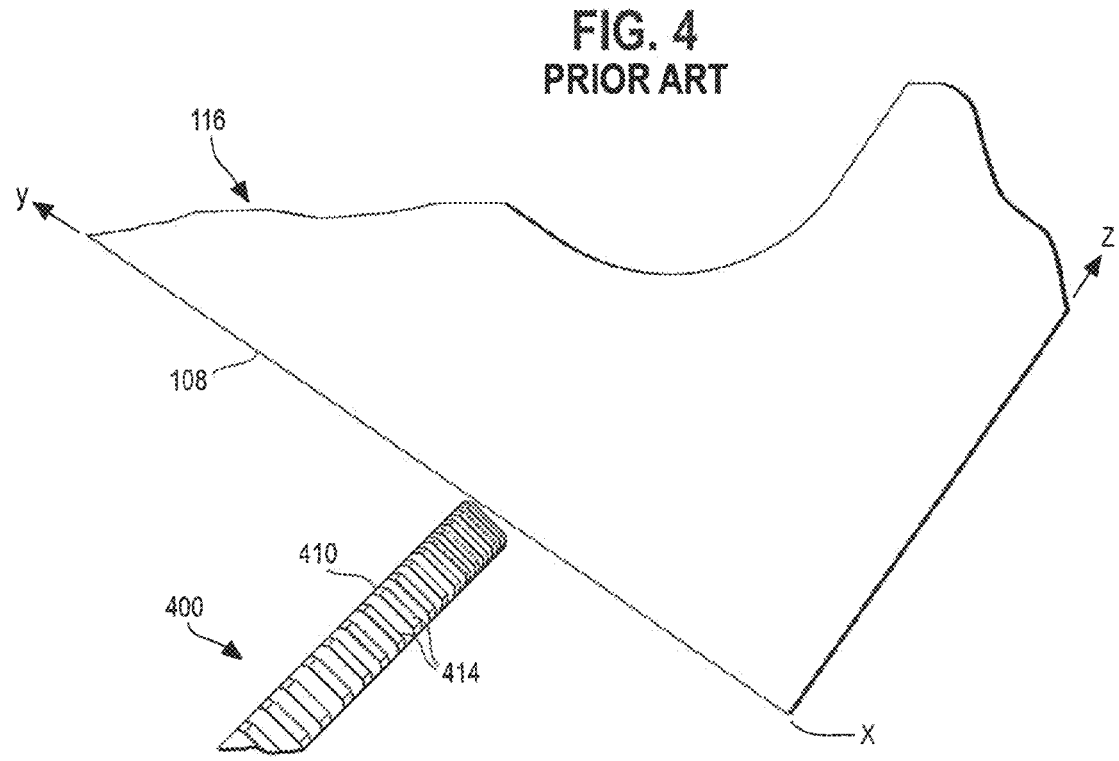
FIG. 4 is an enlarged view of a portion of the prior art measuring device and workpiece shown enclosed in the circled area in FIG. 3.

The base body 180 and the swing plate 184 are connected by a shoulder bolt 188 (FIG. 27) defining a pivot axis $P_1$ (see FIG. 10) that is parallel to, and spaced from, the Y-axis. The swing plate 184 is pivotally biased relative to the base body 180 by a compression spring 192 (FIG. 27) so that the attached (as described below) measurement wheel 140 is biased against the workpiece surface 108 to create sufficient friction to maintain rolling contact between the wheel 140 and workpiece surface 108 without sliding. The biasing force between the base body 180 and the swing plate 184 may be adjusted by threading or unthreading a bolt 194 (FIG. 27) in the base body 180 against a plunger 196 (FIG. 27) contacting the end of the compression spring 192. It should be appreciated that advantages disclosed herein could also be obtained with other mechanisms to bias the wheel 140 toward the workpiece surface 116. For example, the wheel 140 could be forced or biased against the surface of the workpiece 116 by hydraulic, electric, or pneumatic actuators, or other types of springs, etc. Further, the linear slide biasing mechanisms of the prior art device 400 shown in FIG. 3 could be advantageously used to translate the wheel 140 in the Z-direction and, in still other applications, the base 130 of the measuring device 104 could be fixed in the Z-direction.

Figure 15:
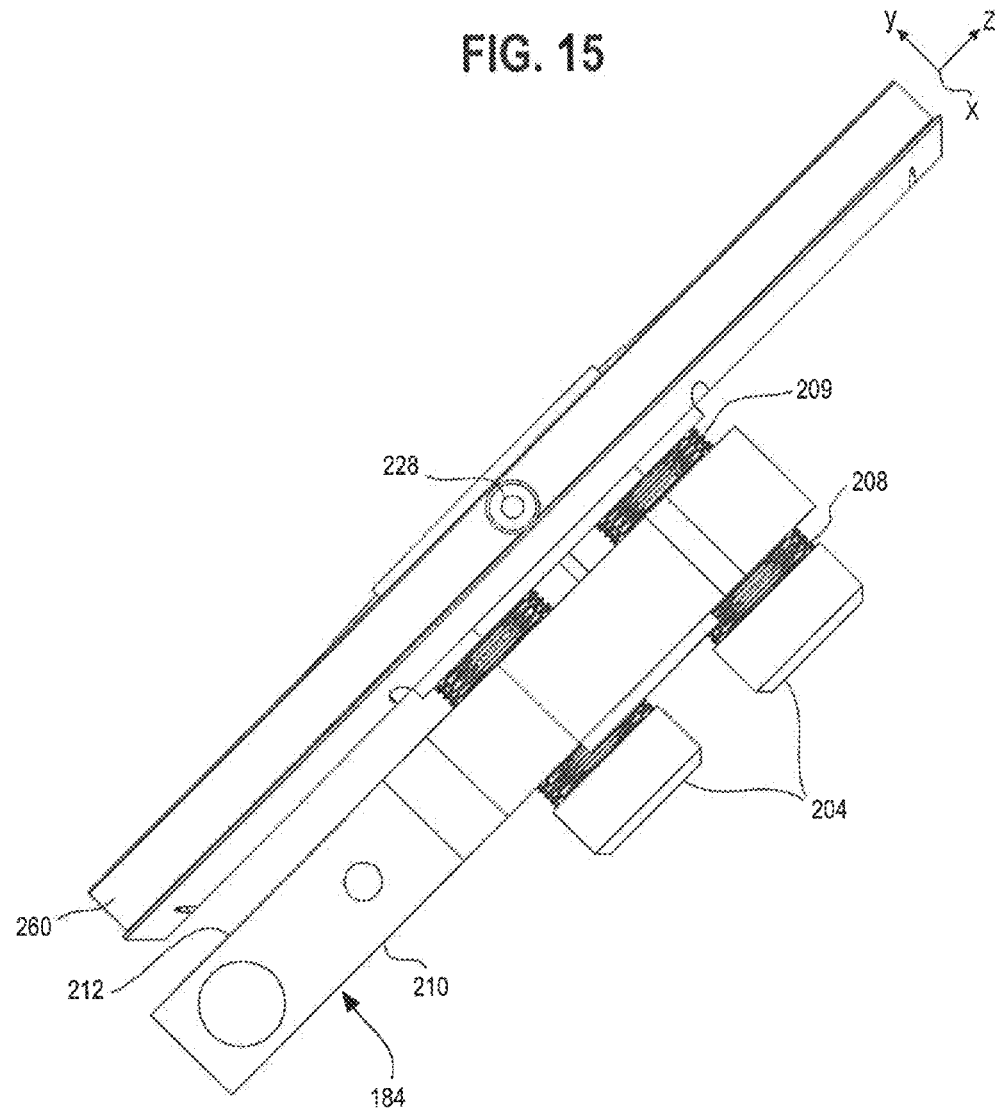
FIG. 15 is a rear elevation view of the measuring device components shown in FIG. 13.

Referring to FIG. 8, the swing plate 184 of the base 130 has four large apertures 200 through which four shoulder bolts 204 oriented in the Y-direction extend (FIG. 15). The shoulder bolts 204 include a head on one end and threads on the opposite end secured in threaded holes 206 (FIG. 28) in the pivot body 150. Biasing members 208 are positioned around the bolts 204 and between the heads of the bolt and the underside 210 (FIG. 25) of the swing plate 184, and additional biasing members 209 are positioned between the other side 212 (FIG. 25) of the swing plate 184 and the pivot body 150. It should be understood that any suitable biasing means may be used, including compression springs, wave springs, torsion springs, tension springs, electric actuators, hydraulic actuators, pneumatic actuators, etc. Advantageously, the shoulder bolts 204 and biasing members 208, 209 allow the pivot body 150 to translate in the Y-direction relative to the swing plate 184 of the base 130 responsive to forces in the Y-direction acting on the wheel 140 as discussed hereafter.

The pivot body 150 (FIGS. 28-30) is generally rectangular in shape with aligned openings 222 extending in the X-direction on opposite sides of a central aperture 216. Pins 228 extend between the pivot body aligned openings 224 to apertures 232 (FIG. 9) in the ring body 160 to support the ring body 160 for pivoting relative to the pivot body 150 about the pivot axis "P" (FIG. 11) parallel to, and spaced from, the X-axis.

Figure 16:
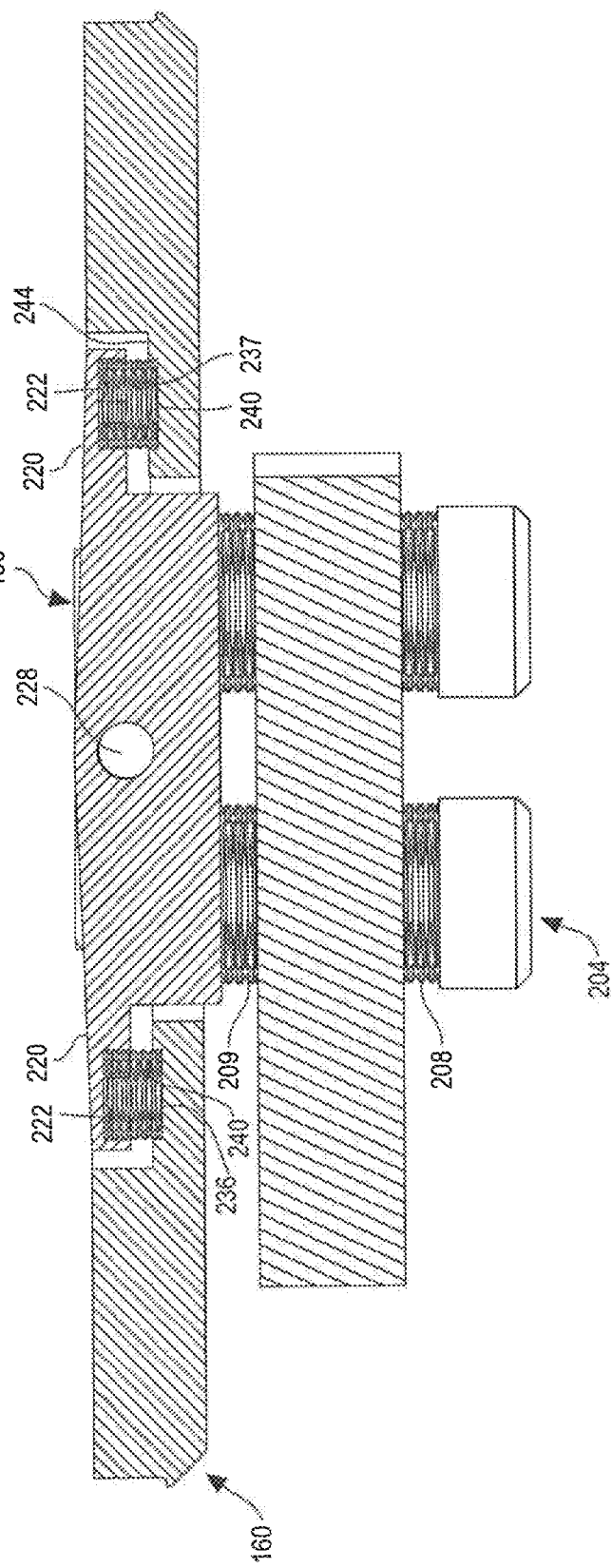
FIG. 16 is a cross-sectional view taken generally along line 16-16 of FIG. 13.
Figure 17:
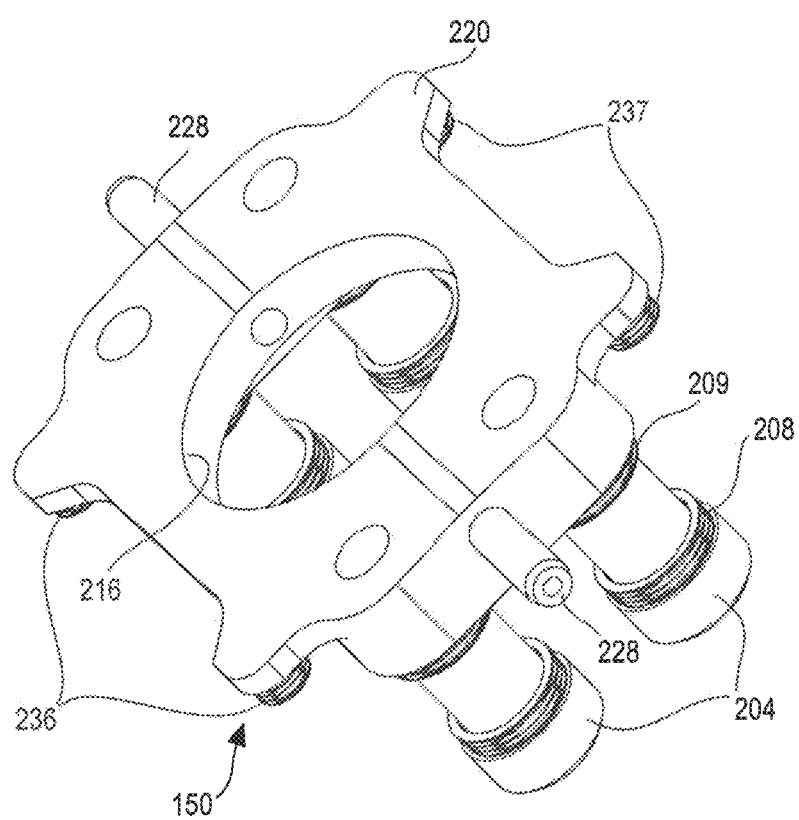
FIG. 17 is a perspective view taken from above of the pivot body and selected components of the measuring device shown in FIG. 13.
Figure 18:
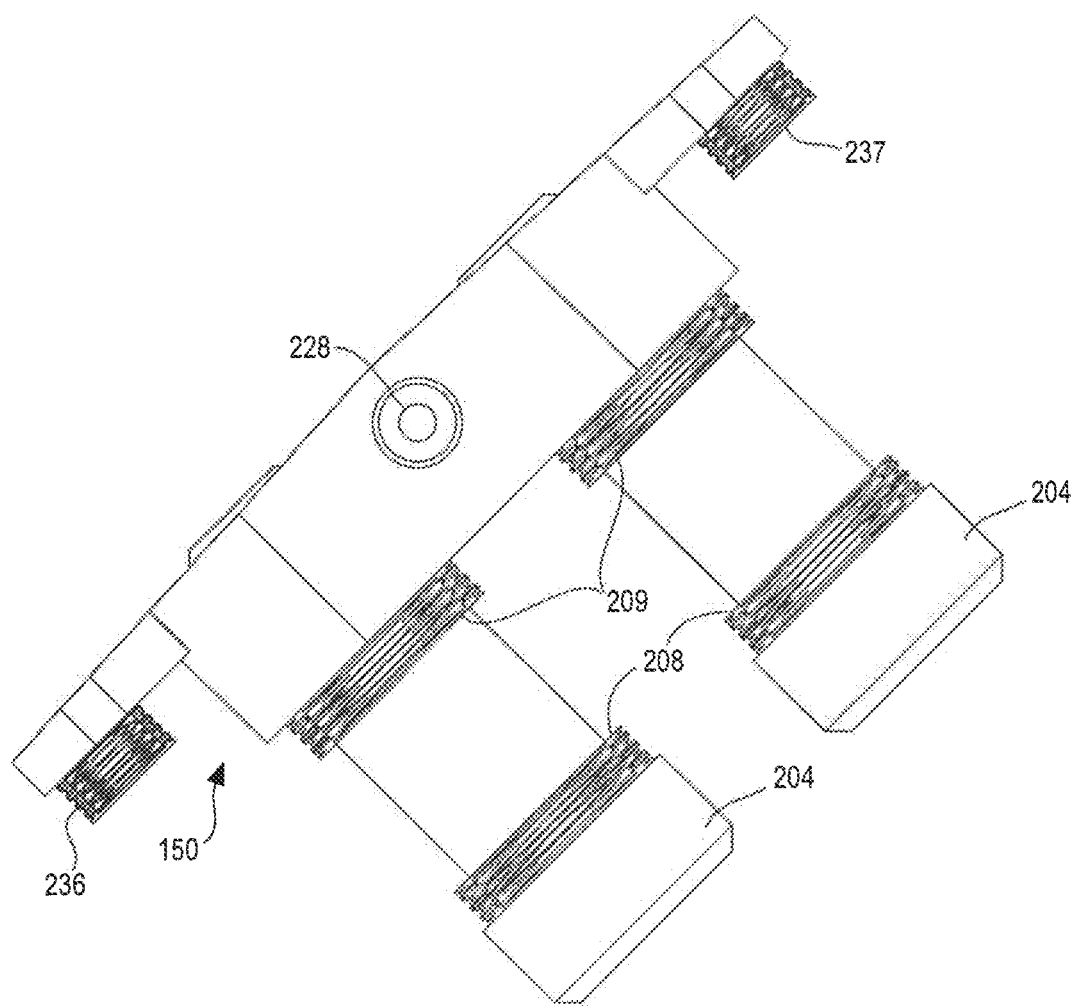
FIG. 18 is a rear elevation view of the measuring device components shown in FIG. 17.
Figure 20:
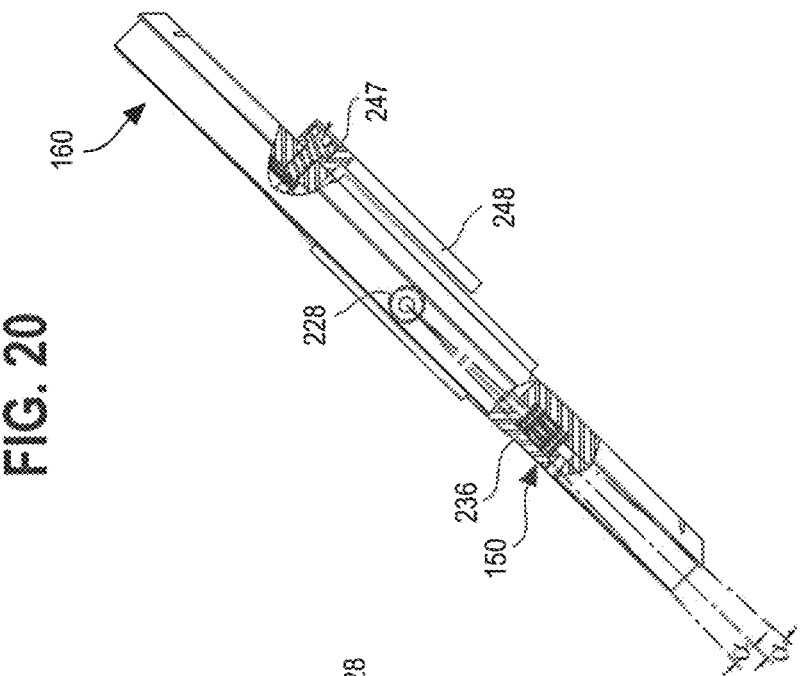
FIG. 20 is a broken, rear elevation view of the subassembly of FIG. 19 with portions of the sensor mount, ring body and pivot body broken away.
Figure 19:
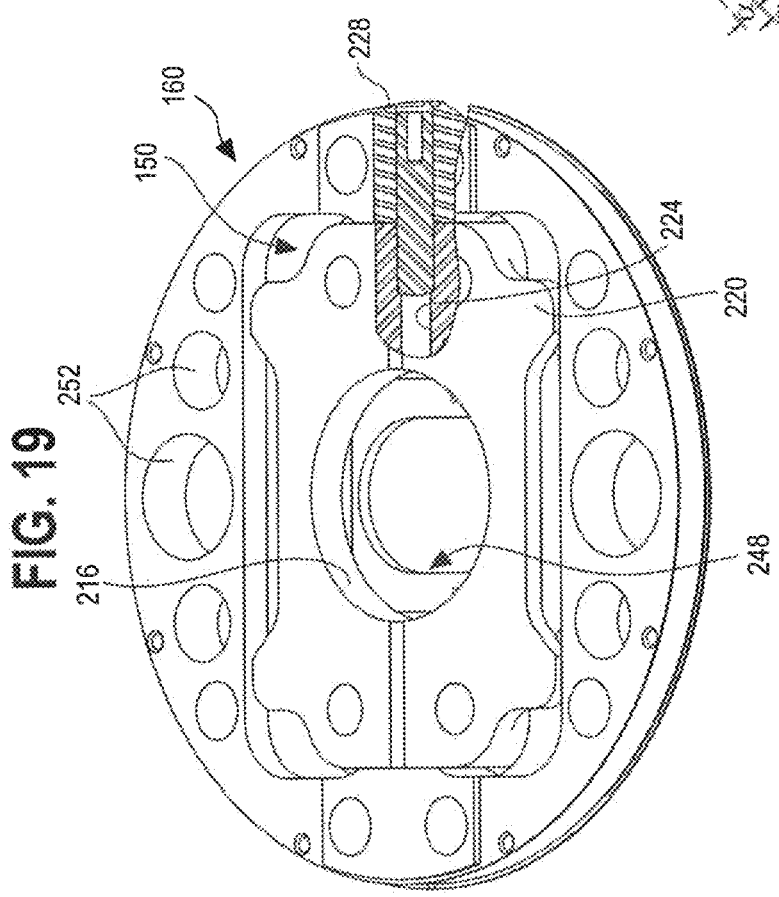
FIG. 19 is a broken, right side elevation view of a subassembly of the measuring device including a portion of the pivot body, the ring body, and the pin broken away from an area around the pivot axis between the pivot body and the ring body.

The pivot body 150 also includes four projections or tabs 220 (e.g., FIGS. 8, 9, and 16) having recesses 222 aligned with, and overlying, corresponding recesses 240 in the ring body 160 (FIG. 16). Suitable biasing mechanisms or springs 236, 237 extend between aligned recesses 222, 240, where two springs 236 on one side of pivot axis "P" bias the ring body 160 relative to the pivot body 150 in one direction of rotation about pivot axis "P", and the two springs 237 on the other side of pivot axis "P" bias the ring body 160 relative to the pivot body 150 in the other direction of rotation about pivot axis "P". Advantageously, the springs 236, 237 may be located an equal distance on either side of the pivot axis "P" such that the ring body 160 is self-centering of with respect to the pivot body 150. Pivoting of the ring body 160 about the pivot axis "P" is limited (e.g., to an angle α in FIG. 20, which advantageously may be about three degrees in either direction from the self-centered position).

It should be understood that while the springs 236, 237 are shown as compression wave springs, other suitable biasing mechanisms may be used, including coil springs, torsion springs, tension springs, electric actuators, hydraulic actuators, pneumatic actuators, etc.

Figure 12:
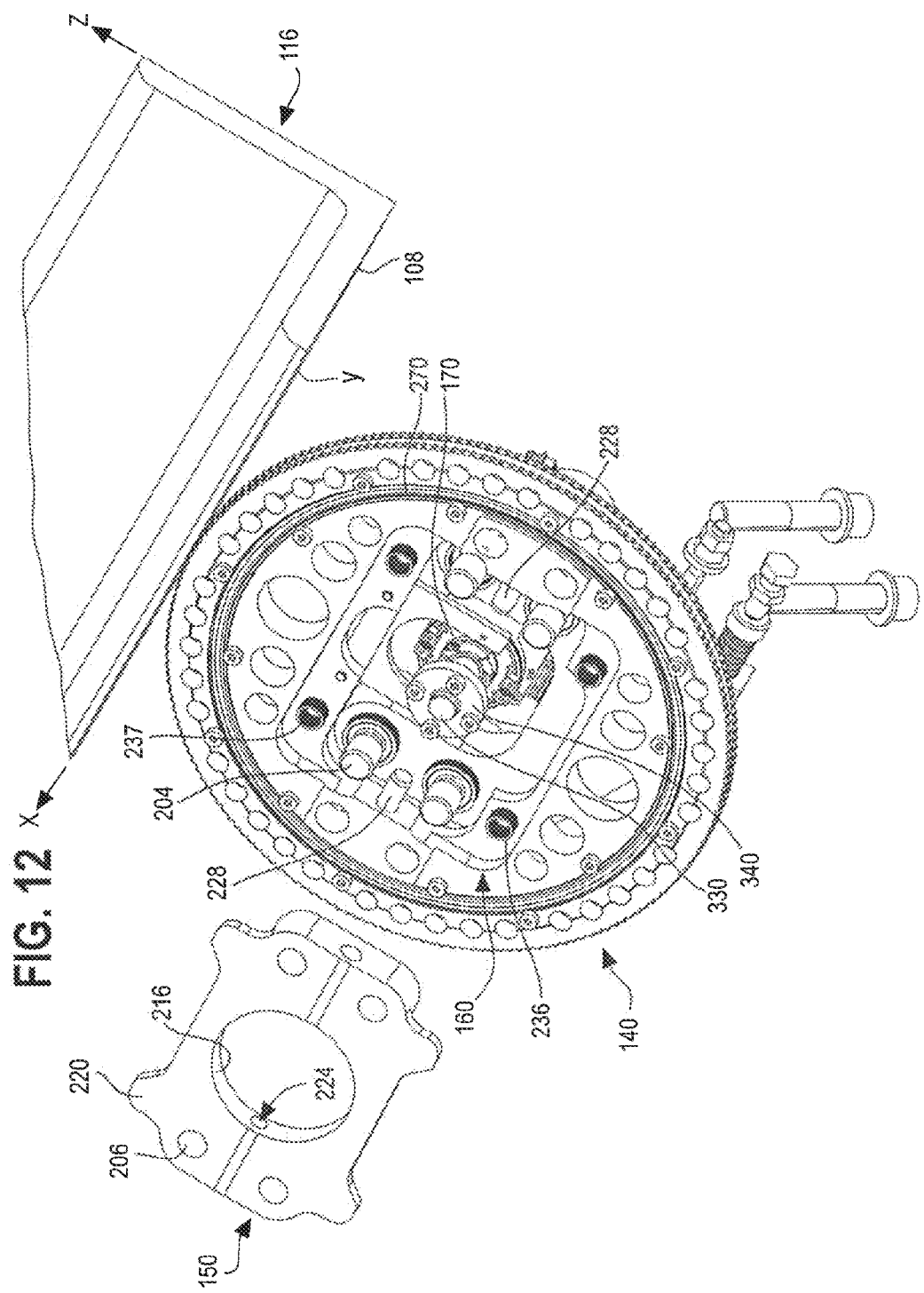
FIG. 12 is an exploded view of selected components of the measuring device shown in FIG. 11, wherein the pivot body has been exploded away from the remaining components of the measuring device.
Figure 13:
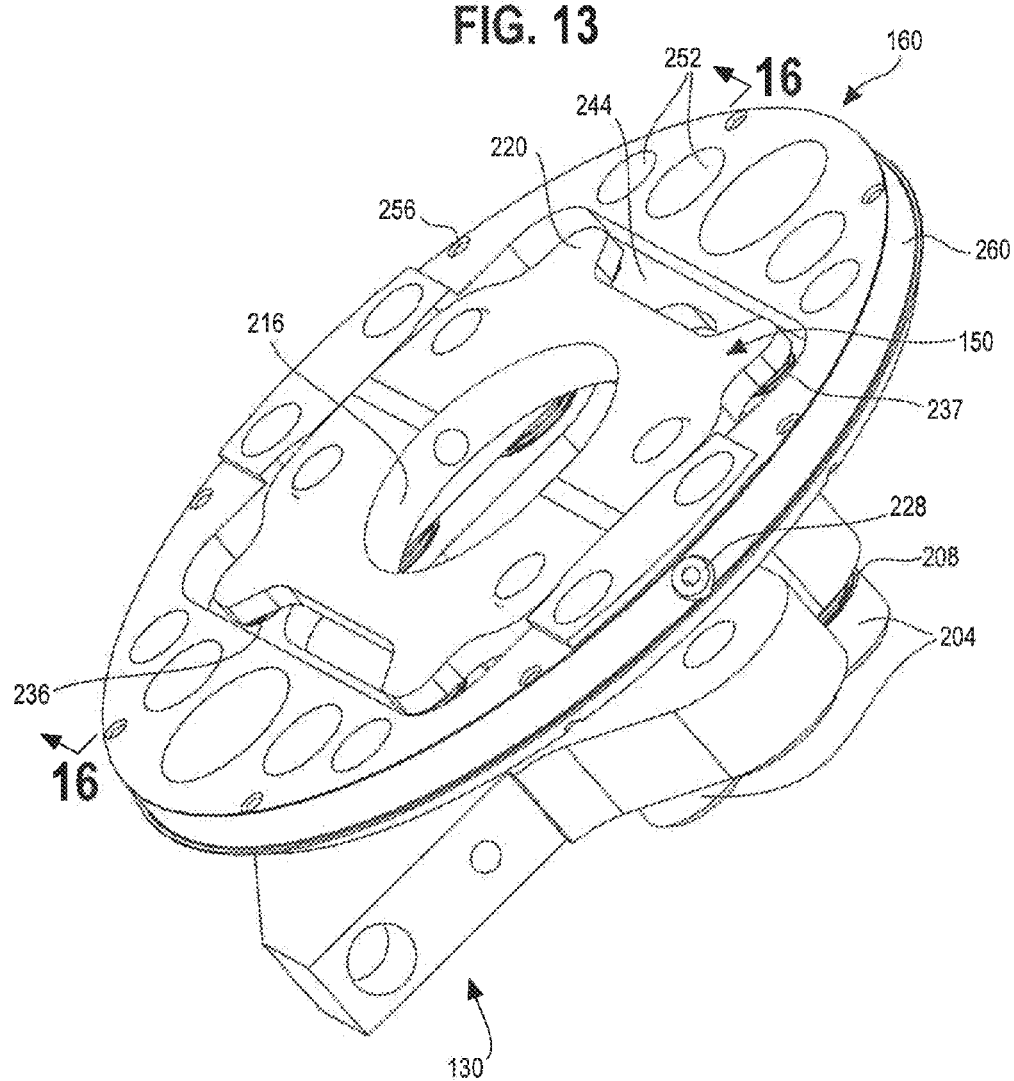
FIG. 13 is a perspective view of selected components of the measuring device shown in FIG. 11.
Figure 14:
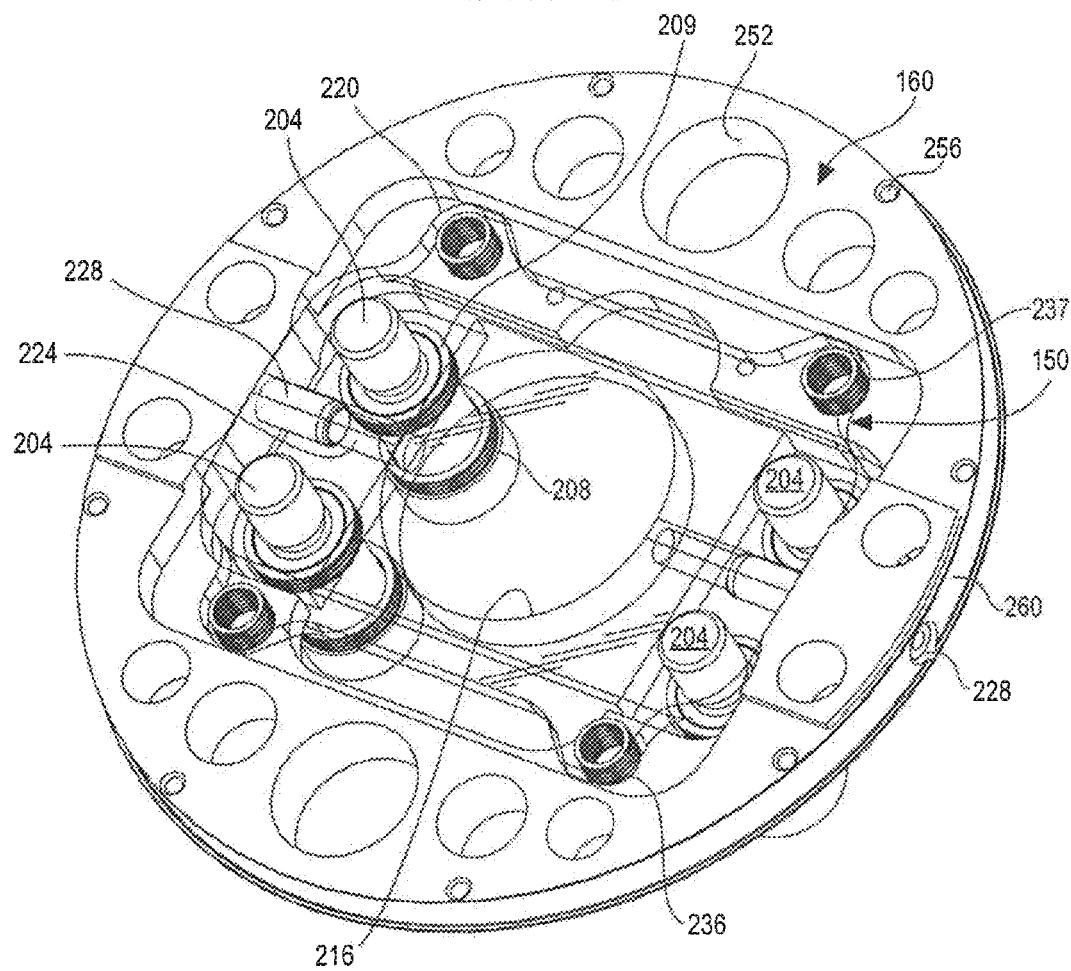
FIG. 14 is a perspective view taken of selected components of the measuring device shown in FIG. 13, with the pivot body as transparent for illustrative purposes only.

As best seen in FIGS. 31-32, the ring body 160 has a generally ring-shape with a central cut-out or internal space 242 that partially defines a recessed surface 244 within the ring body 160. The internal space 242 accommodates limited pivotable movement of the ring body 160 relative to the pivot body 150, whereby the ring body 160 may compress springs 236 or 237 to pivot an angle α of up to three degrees about the pins 228 (FIGS. 9 and 12). The ring body 160 suitably supports a sensor mount 248 (e.g., by threaded fasteners 247, 250 in aligned holes 246, 249) which supports a rotational sensor 170 (FIG. 27).

The radially inward portion of a suitable bearing 270 is secured against the cylindrical outer surface 260 of the ring body 160 (e.g., by threaded fasteners 264 in threaded holes 256; FIGS. 21-22). The bearing 270 has a radially inner portion 274 fixed to the ring body 160 and a radially outer portion 278 rotatable about the inner portion 274 (by, e.g., riding on a plurality of ball bearings 279 therebetween) about the axis of rotation "R" defined by the ring body 160 (e.g., FIGS. 22 and 24).

The wheel 140 is suitably fixed to the bearing outer portion 278 (FIG. 22) so that the wheel 140 and bearing outer portion 278 rotate together about the axis of rotation "R". For example, a lower or bottom flange 282 projecting radially inwardly from a wheel interior cylindrical surface 286 (FIGS. 24, 36) of the wheel 140 may be trapped by the heads of eight threaded fasteners 290 threaded into eight circumferential holes 294 in the wheel 140, with the fasteners 290 holding a flange 298 of a central hub 302 against a second side of the radially outward portion 278 of the bearing 270. However, it should be understood that any structure wherein the wheel 140 is supported for free rotation relative to the ring body 160 about axis of rotation "R" would be suitable.

The wheel 140 has a pair of rim portions 306 spaced apart in the direction of the axis of rotation "R" by an arcuate channel 310 extending circumferentially around the wheel 140. The rim portions 306 have the same radius "r" centered around the axis of rotation "R" such that the wheel 140 has a tendency to self-center with both rim portions 306 making normal contact with the workpiece surface 108 (FIG. 10A). As can be seen in FIG. 34, each rim portion 306 has a plurality of circumferentially spaced teeth 314 providing substantially slip-free, rolling contact with the workpiece surface 108 (FIG. 10A).

The ring body 160 and wheel 140 may include a plurality of through holes or apertures (252, 316, respectively), with the ring body through holes 252 symmetrically located with respect to the pivot axis "P" (see FIG. 31) and the wheel through holes 316 symmetrically and concentrically spaced about the axis of rotation "R" of the wheel 140. Such through holes reduce the mass and rotational inertia of the ring body 160 and wheel 140 as they pivot/rotate. Reduction of the mass of the wheel 140 reduces the likelihood of the wheel 140 slipping or sliding instead of making rolling contact with the workpiece surface 108 when the wheel 140 initially begins to rotate or when the wheel 140 ceases to rotate.

Figure 26:
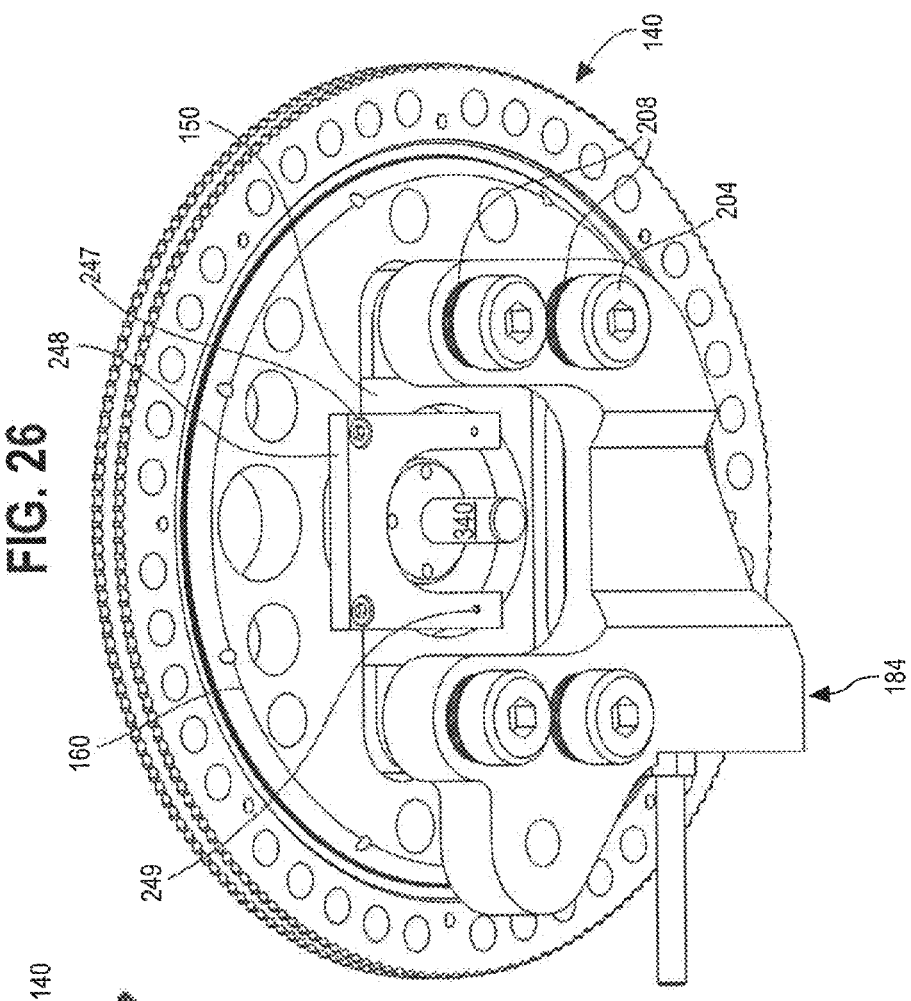
FIG. 26 is a left side elevation view of the subassembly of FIG. 25.
Figure 25:
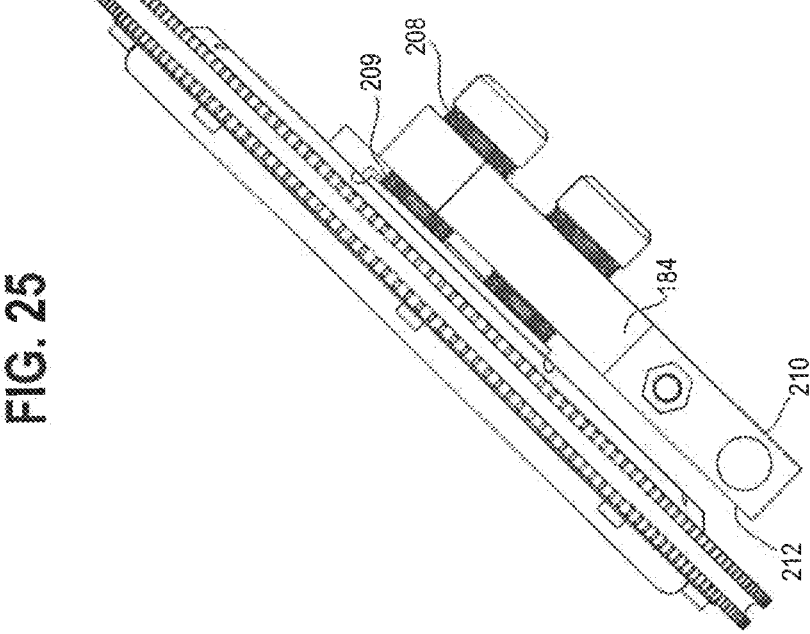
FIG. 25 is a rear elevation view of the subassembly of FIG. 24 assembled together with a movable member of a base.

The central hub 302 (see FIGS. 37 and 38) has a top wall 318 with a central circular aperture 322 and four concentric counterbored holes 326, and is suitably secured to the wheel 140 for rotation therewith (e.g., by fasteners 290; FIG. 24). The central circular aperture 322 is centered on axis of rotation "R" and receives a cylindrical projection 330 when assembled to a central shaft 340 (FIGS. 23 and 24). Fasteners 344 extend through the hub counterbored holes 326 and are suitably secured to four threaded holes 348 of a flange 352 of the central shaft 340. As can be seen in FIG. 26, the central shaft 340 extends through the ring member 160, the pivot member 150, and the sensor mount 248, and extends into the sensor or shaft encoder 170 (FIG. 27). The sensor 170 may be any suitable device which measures the rotational motion of the central shaft 340, which is the same rotation as that of the wheel 140 as it rolls along the workpiece surface 108 (FIGS. 10 and 11).

As previously mentioned, the measuring device 104 is especially suitable for use with a processing machine, such as the processing machine 100 shown in FIGS. 1 and 2. When a workpiece 116 is clamped against the datum surfaces of the machine 100, the workpiece surface 108 that is being measured generally resides within an X-Y plane and the measuring device 104 is most advantageously positioned such that its wheel 140 is normal to, and biased against, the workpiece surface 108. Specifically, as illustrated in FIGS. 10 and 11, the wheel 140 is spring biased against the workpiece surface 108 generally in the Z-direction by the compression spring 192 biasing the base swing plate 184 through a short arc around axis $R_1$ defined by shoulder bolt 188. The biasing force of the spring 192 effectively moves the entire sub-assembly of the pivot body 150, the ring body 160, and the wheel 140 normal to the workpiece surface 108 whereby the wheel 140 will make substantially rolling contact without slipping or sliding on the workpiece surface 108 as the workpiece 116 is moved through the processing machine 100 in the X-direction.

Moreover, with the measuring device 104 such as described herein, the wheel 140 may advantageously be maintained substantially normal to the workpiece surface 108 even when imperfections in that surface 108 are encountered.

For example, if the workpiece surface 108 has a material defect and is toed in or toed out such that the workpiece surface 108 becomes angled with respect to the X-Y plane as the workpiece 116 is moved along the X-axis, then the wheel 140 and ring body 160 will pivot with respect to the pivot body 150 about the pivot axis "P" up to the limited angle α whereby the teeth 314 of the wheel 140 will maintain a substantially normal and rolling contact with the workpiece surface 108. Forces developed between the teeth 314 and the workpiece surface 108 are reduced or at least minimized by this pivoting capability such that wear on the teeth 314 is reduced or at least minimized because the teeth 314 are not rolling on-edge upon the workpiece surface 108. Furthermore, the pivoting of the wheel 140 and ring body 160 will compress either the biasing mechanisms 236 or biasing mechanisms 237 (depending on the direction of pivoting about the pivot axis "P") to store potential energy. If the workpiece surface 108 moves back toward or into the X-Y plane, then the biasing mechanisms 236 or biasing mechanisms 237 will release their potential energy to center or urge the wheel 140 and ring body 160 back into a centered position substantially normal to the X-Y plane.

As a further example, if the workpiece surface 108 experiences an impact due to a cutting process such that the workpiece surface 108 translates in the direction of the Y-axis, then the wheel 140, the pivot body 150, and the ring body 160 will translate in the direction of the Y-axis to reduce or at least minimize forces in the Y-direction developed between the teeth 314 of the wheel 140 and the workpiece surface 108. Such forces would tend to exert a torque or moment on the wheel 140 such as could warp the wheel 140 over time. Furthermore, the translation of the wheel 140, ring body 160, and pivot body 150 will compress either the biasing members 208 or biasing members 209 (depending on the direction of translation along the Y-axis) to store potential energy. If the workpiece surface 108 translates back toward its original position along the Y-axis, then the biasing members 208 or biasing members 209 will release their potential energy to center or urge the wheel 140, the ring body 160, and the pivot body 150 back into a location along the Y-axis such that the biasing members 208, 209 are centered or in a state of equilibrium.

The measuring device 104, by reducing or at least minimizing the wear and/or warping of the wheel 140, may have an increased service life and/or an increased measurement accuracy over the service life of the measuring device 104.

Referring now to FIGS. 10 and 11, as the workpiece 116 is moved through the processing machine 100 (FIGS. 1 and 2) along the X-axis, the wheel 140 rotates about the axis of rotation "R", with the hub 302 and central shaft 340 rotating therewith. The sensor 170 records rotational movement of the central shaft 340, which, as discussed above, can be used to calculate the linear distance travelled by the workpiece 116 in the X-direction based on the known radius "r" (FIG. 33) of the wheel 140. Data from the sensor 170 may be, for example, transmitted via a suitable connection to a control system for the processing machine 100. For example, data from the sensor 170 could be transmitted via any suitable wired or wireless connection to a processor, PLC, computer, or control system for data acquisition and control of the processing machine 100.

It should be understood that the above description of the operation of the measuring device 104 would be essentially identical if the measuring device 104 were to be located, for example, on the outlet side 122 of the processing machine 100. Furthermore, it should be appreciated that while various theories and explanations have been set forth herein with respect to how the component configurations and arrangements may affect the operation of the measuring device, there is no intention to be bound by such theories and explanations. Further it is intended that all structures falling within the scope of the appended claims are not to be otherwise excluded from the scope of the claims merely because the operation of such measuring device components may not be accounted for by the explanations and theories presented herein.

Various modifications and alterations to this invention will become apparent to those skilled in the art without departing from the scope and spirit of this invention. The illustrative embodiment is provided as an example only and is not intended to limit the scope of the present invention.

The invention claimed is:

1. In a space having orthogonal X-Y-Z axes, a device (104) for measuring a surface (108) of a workpiece (116) in the direction of said X-axis, the surface (108) residing generally within an X-Y plane, the measuring device (104) comprising:
   a pivot body (150) movable relative to the workpiece surface (108) in the direction of said X-axis;
   a ring body (160) supported for pivoting relative to said pivot body (150) about a pivot axis spaced from and substantially parallel to said X-axis, said pivoting being in a limited angular range;
   a measurement wheel (140) rotatable about an axis of rotation fixed relative to said ring body (160) and having a radius with respect to said axis of rotation, said axis of rotation being:
      within said limited angular range of parallel to said Y-axis, and
      spaced from the workpiece surface (108) in the direction of the Z-axis by substantially said radius of said measurement wheel (140),
      whereby said measurement wheel (140) rolls along the workpiece surface (108) when the workpiece (116) and said pivot body (150) move relative to one another in the direction of said X-axis.

2. The measuring device (104) of claim 1, further comprising a base (130) substantially fixed in the direction of said Y-axis, wherein said pivot body (150) is supported for limited movement relative to said base (130) in a direction substantially parallel to said Y-axis.

3. The measuring device (104) of claim 2, further comprising a biasing member (208, 209) biasing said pivot body (150) away from said base (130) in a direction substantially parallel to said Y-axis.

4. The measuring device (104) of claim 3 wherein said biasing member (208, 209) comprises a compression spring disposed between said pivot body (150) and said base (130).

5. The measuring device (104) of claim 2, further comprising:
   a first biasing member (208) biasing said pivot body (150) away from said base (130) in a first direction substantially parallel to said Y-axis; and
   a second biasing member (209) biasing said pivot body (150) away from said base (130) in a second direction substantially parallel to said Y-axis and opposite said first direction.

6. The measuring device (104) of claim 5 wherein said first and second biasing members (208, 209) are compression springs biasing against opposite sides (210, 212) of said base (130).

7. The measuring device (104) of claim 1 wherein said measurement wheel (140) has a pair of rim portions (306) spaced-apart in a direction of said axis of rotation of said measurement wheel (140).

8. The measuring device (104) of claim 7 wherein each of said rim portions (306) further comprises a plurality of substantially uniformly-spaced teeth (314) extending radially outward from said measurement wheel (140).

9. The measuring device (104) of claim 7 wherein said rim portions (306) are centered on said axis of rotation and substantially equidistantly spaced from a geometric center of said measurement wheel (140).

10. The measuring device (104) of claim 1 wherein said limited angular range is within about 3 degrees of parallel to said Y-axis.

11. The measuring device (104) of claim 1, further comprising a biasing mechanism (236, 237) biasing said ring body (160) toward pivoting in a first direction of rotation about said pivot axis.

12. The measuring device (104) of claim 1, further comprising:
 a first biasing mechanism (236) biasing said ring body (160) toward pivoting relative to said pivot body (150) in a first direction of rotation about said pivot axis; and
 a second biasing mechanism (237) biasing said ring body (160) toward pivoting relative to said pivot body (150) in a second direction of rotation about said pivot axis, opposite said first direction of rotation.

13. The measuring device (104) of claim 1, further comprising a sensor (170) for recording the rotational movement of said measurement wheel (140) about said axis of rotation.

14. The measuring device (104) of claim 1, further comprising a plurality of apertures (252) through said ring body (160) and arranged symmetrically about said pivot axis.

15. The measuring device (104) of claim 1, further comprising a base (130) having:
 (i) a fixed portion (180) selectively fixed in the direction of said Y-axis; and
 (ii) a movable portion (184) supported for limited movement relative to said fixed portion (180) in the direction of the Z-axis.

16. The measuring device (104) of claim 15 wherein said movable portion (184) is supported for selective pivoting relative to said fixed portion (180) about a second pivot axis spaced from and substantially parallel to said Y-axis.

17. In a space having orthogonal X-Y-Z axes, a device (104) for measuring a surface (108) of a workpiece (116) in the direction of said X-axis, the surface (108) residing generally within in an X-Y plane, the measuring device (104) comprising:
 a base (130) selectively fixed in at least the direction of said Y-axis, the workpiece surface (108) and said base (130) movable relative to one another in the direction of said X-axis;
 a ring body (160) supported for limited movement relative to said base (130) in a direction substantially parallel to said Y-axis; and
 a measurement wheel (140) rotatable about an axis of rotation fixed relative to said ring body (160) and having a radius with respect to said axis of rotation, said axis of rotation being spaced from the workpiece surface (108) in the direction of the Z-axis by substantially said radius of said measurement wheel (140) whereby said measurement wheel (140) rolls along the workpiece surface (108) when the workpiece (116) and said base (130) move relative to one another in the direction of said X-axis.

18. The measuring device (104) of claim 17, whereby said ring body (160) is connected to a pivot body (150) and said pivot body (150) is connected to said base (130) with a first biasing member (208 or 209) biasing said pivot body (150) toward movement relative to said base (130) in a first direction substantially parallel to said Y-axis.

19. The measuring device (104) of claim 18, wherein said ring body (160) is supported for pivoting relative to said pivot body (150) about a pivot axis spaced from and substantially parallel to said X-axis, said pivoting being within said limited angular range.

20. The measuring device (104) of claim 19, further comprising:
 a first biasing mechanism (236) biasing said ring body (160) toward pivoting in a first direction of rotation about said pivot axis; and
 a second biasing mechanism (237) biasing said ring body (160) toward pivoting in a second direction of rotation about said pivot axis, opposite said first direction of rotation.

\* \* \* \* \*